US012134876B2

(12) United States Patent
Ready-Campbell et al.

(10) Patent No.: US 12,134,876 B2
(45) Date of Patent: *Nov. 5, 2024

(54) AUTONOMOUS OPERATION BY EARTH-MOVING VEHICLE BASED ON TRIGGERING CONDITIONS

(71) Applicant: Built Robotics Inc., San Francisco, CA (US)

(72) Inventors: Noah Austen Ready-Campbell, San Francisco, CA (US); Andrew Xiao Liang, San Francisco, CA (US); Gaurav Jitendra Kikani, San Francisco, CA (US); Joonhyun Kim, San Francisco, CA (US)

(73) Assignee: BUILT ROBOTICS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,233

(22) Filed: May 5, 2023

(65) Prior Publication Data

US 2023/0272597 A1 Aug. 31, 2023

Related U.S. Application Data

(63) Continuation of application No. 17/190,828, filed on Mar. 3, 2021, now Pat. No. 11,680,384.

(51) Int. Cl.
*E02F 9/20* (2006.01)
*E02F 9/26* (2006.01)
(Continued)

(52) U.S. Cl.
CPC .............. *E02F 9/205* (2013.01); *E02F 9/267* (2013.01); *G05D 1/0016* (2013.01);
(Continued)

(58) Field of Classification Search
CPC ... E02F 9/205; E02F 9/267; E02F 9/24; E02F 9/262; E02F 3/325; E02F 9/265;
(Continued)

(56) References Cited

U.S. PATENT DOCUMENTS 9,481,977 B1 11/2016 Clar et al.
10,066,367 B1 9/2018 Wang et al.
(Continued)

FOREIGN PATENT DOCUMENTS

WO WO 2021/025933 A1 2/2021

OTHER PUBLICATIONS

International Search Report and Written Opinion, Patent Cooperation Treaty Application No. PCT/US2022/017735, Mar. 14, 2022, 12 pages.
(Continued)

*Primary Examiner* — Sahar Motazedi
(74) *Attorney, Agent, or Firm* — Fenwick & West LLP

(57) ABSTRACT

An earth moving vehicle (EMV) autonomously performs an earth moving operation within a dig site. If the EMV determines that a state of the EMV or the dig site triggers a triggering condition associated with a pause in the autonomous behavior of the EMV, the EMV determines a risk associated with the state or triggering condition. If the risk is greater than a first threshold, the EMV continues the autonomous performance and notifies a remote operator that the triggering condition was triggered. If the risk is greater than the first threshold risk but less than a second threshold risk, the EMV is configured to operate in a default state before continuing and notifying the remote operator. If the risk is greater than the second threshold risk, the EMV notifies the remote operator of the state pauses the performance until feedback is received from the remote operator.

20 Claims, 16 Drawing Sheets

(51) Int. Cl.
*G05D 1/00* (2024.01)
*G05D 1/02* (2020.01)

(52) U.S. Cl.
CPC ......... *G05D 1/0214* (2013.01); *G05D 1/0238* (2013.01); *G05D 1/0278* (2013.01)

(58) Field of Classification Search
CPC .. G05D 1/0016; G05D 1/0214; G05D 1/0238; G05D 1/0278; G05D 2201/0202; G05D 1/024; G05D 1/0246; G05D 1/0274; G05D 1/0038
See application file for complete search history.

(56) References Cited

U.S. PATENT DOCUMENTS

| | | | |
|---|---|---|---|
| 10,662,613 B2 | 5/2020 | Ready-Campbell et al. | |
| 10,801,177 B2 | 10/2020 | Ready-Campbell et al. | |
| 10,829,911 B2 | 11/2020 | Kennedy et al. | |
| 11,016,501 B2 | 5/2021 | Ready-Campbell et al. | |
| 2018/0340790 A1* | 11/2018 | Kislovskiy | G01C 21/3484 |
| 2019/0011910 A1 | 1/2019 | Lockwood et al. | |
| 2019/0176862 A1 | 6/2019 | Kumar et al. | |
| 2019/0258246 A1 | 8/2019 | Lui et al. | |
| 2020/0071912 A1* | 3/2020 | Kennedy | G06V 20/17 |
| 2020/0219401 A1* | 7/2020 | Ren | H04W 4/022 |
| 2020/0310417 A1 | 10/2020 | Pedersen et al. | |
| 2020/0409352 A1 | 12/2020 | Caldwell et al. | |
| 2022/0187823 A1 | 6/2022 | Ramasamy et al. | |
| 2022/0244736 A1* | 8/2022 | Konrardy | G06Q 40/08 |
| 2022/0269283 A1* | 8/2022 | Malegam | G05D 1/0285 |

OTHER PUBLICATIONS

United States Office Action, U.S. Appl. No. 17/190,828, filed May 17, 2021, 22 pages.
United States Office Action, U.S. Appl. No. 17/190,828, filed Aug. 31, 2021, 17 pages.
United States Office Action, U.S. Appl. No. 17/190,828, filed Jan. 13, 2022, 17 pages.
United States Office Action, U.S. Appl. No. 17/190,828, filed Jun. 28, 2022, 18 pages.
United States Office Action, U.S. Appl. No. 17/190,828, filed Nov. 25, 2022, 18 pages.

* cited by examiner

AUTONOMOUS OPERATION BY EARTH-MOVING VEHICLE BASED ON TRIGGERING CONDITIONS

CROSS REFERENCE TO RELATED APPLICATIONS

This application is a continuation of U.S. application Ser. No. 17/190,828, filed Mar. 3, 2021, now U.S. Pat. No. 11,680,384, which is incorporated by reference in its entirety.

BACKGROUND

Field of Art

The following disclosure relates generally to a method for moving material to, from, or within a dig site, and, more particularly, to autonomously executing earth moving operations by an earth moving vehicle based on detected risk.

Description of the Related Art

Vehicles, for example backhoes, loaders, and excavators, generally categorized as earth moving vehicles, are used to move earth from locations. Currently, operation of these earth moving vehicles is very expensive as each vehicle requires a manual operator be available and present during the entire process given the unpredictable nature of how earth may move. Further, manual operators may be unable to detect precarious situations as earth is moved within a dig site due to lack of sensor data or knowledge about various earth moving techniques. Thus, the dependence of current earth moving vehicles on manual operators increases the risk of human error during projects and reduce the quality of work done at a dig site.

SUMMARY

Described herein is an autonomous or semi-autonomous earth moving system that unifies an earth moving vehicle with a sensor system for excavating earth or other material from a dig site. The earth moving system controls and navigates an earth moving vehicle within a dig site. The earth moving system uses a combination of sensors integrated into the earth moving vehicle to record the positions and orientations of the various components of the earth moving vehicle and/or the conditions of the surrounding earth. Data recorded by the sensors may be aggregated or processed in various ways, for example, to generate digital representations of a dig site and instructions for excavating earth from the dig site, determine and control the movement of the earth moving vehicle over routes within the dig site, and perform other tasks described herein.

According to one embodiment, an earth moving vehicle (EMV) autonomously performs an earth moving operation within a dig site. While performing the earth moving operation, the EMV determines that a state of one or more of the EMV or the dig site trigger a triggering condition associated with a pause in the autonomous behavior of the EMV. The EMV determines how much risk the state of the EMV or site pose. In response to determining that the determined state of the EMV or site poses less than a first threshold risk, the EMV continues the autonomous performance of the earth moving operation and notifies a remote operator of the EMV that a triggering condition was triggered and the EMV is continuing to perform the earth moving operation. In response to determining that the determined state of the EMV or site poses greater than the first threshold risk but less than a second threshold risk, the EMV is configured to operate in a default state before continuing the autonomous performance of the earth moving operation and notifying the remote operator that the EMV is configured to operate in the default state before continuing to perform the earth moving operation. In response to determining that the determined state of the EMV or site poses greater than the second threshold risk, the EMV notifies the remote operator of the state of the EMV or site and pauses the performance of the earth moving operation until feedback is received from the remote operator.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Earth Moving System

Figure 1:
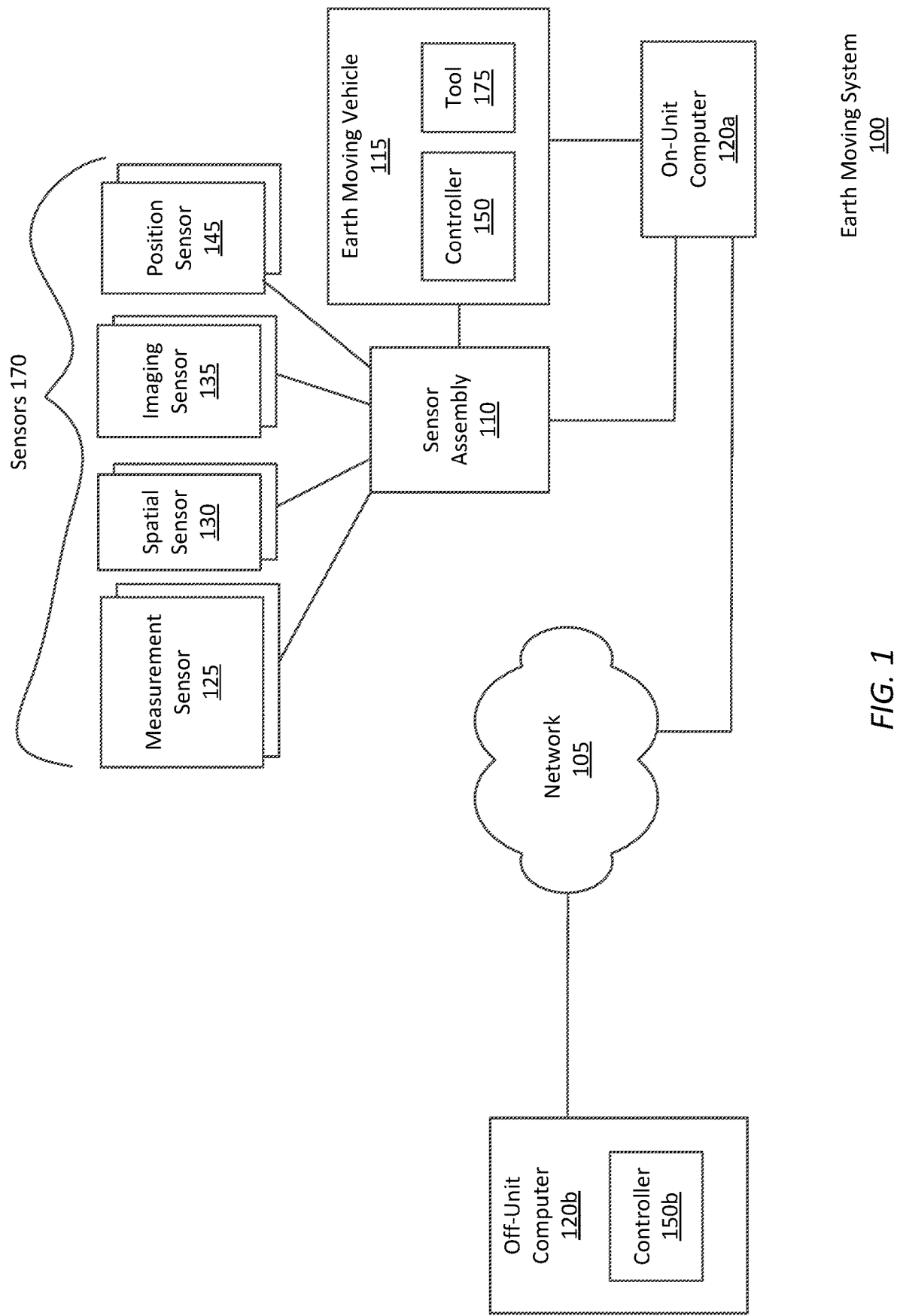
FIG. 1 shows an earth moving system for moving earth at a dig site, according to one embodiment.

FIG. 1 shows an earth moving system 100 for moving (e.g., excavating, digging up, or shaping) earth autonomously or semi-autonomously from a dig site. Though described herein in relation to earth, other materials, such as building materials, may also be moved by the earth moving system 100. For example, the terms "earth moving" and "moving earth" may apply both the movement of dirt, soil, gravel, and the like as well as to non-earth materials, such as boards, concrete, waste materials, and the like. However, the terms "earth moving" and "moving earth" are used throughout the following description for the purposes of simplicity, and are not intended to be limiting to any particular material or context.

Figure 2A:
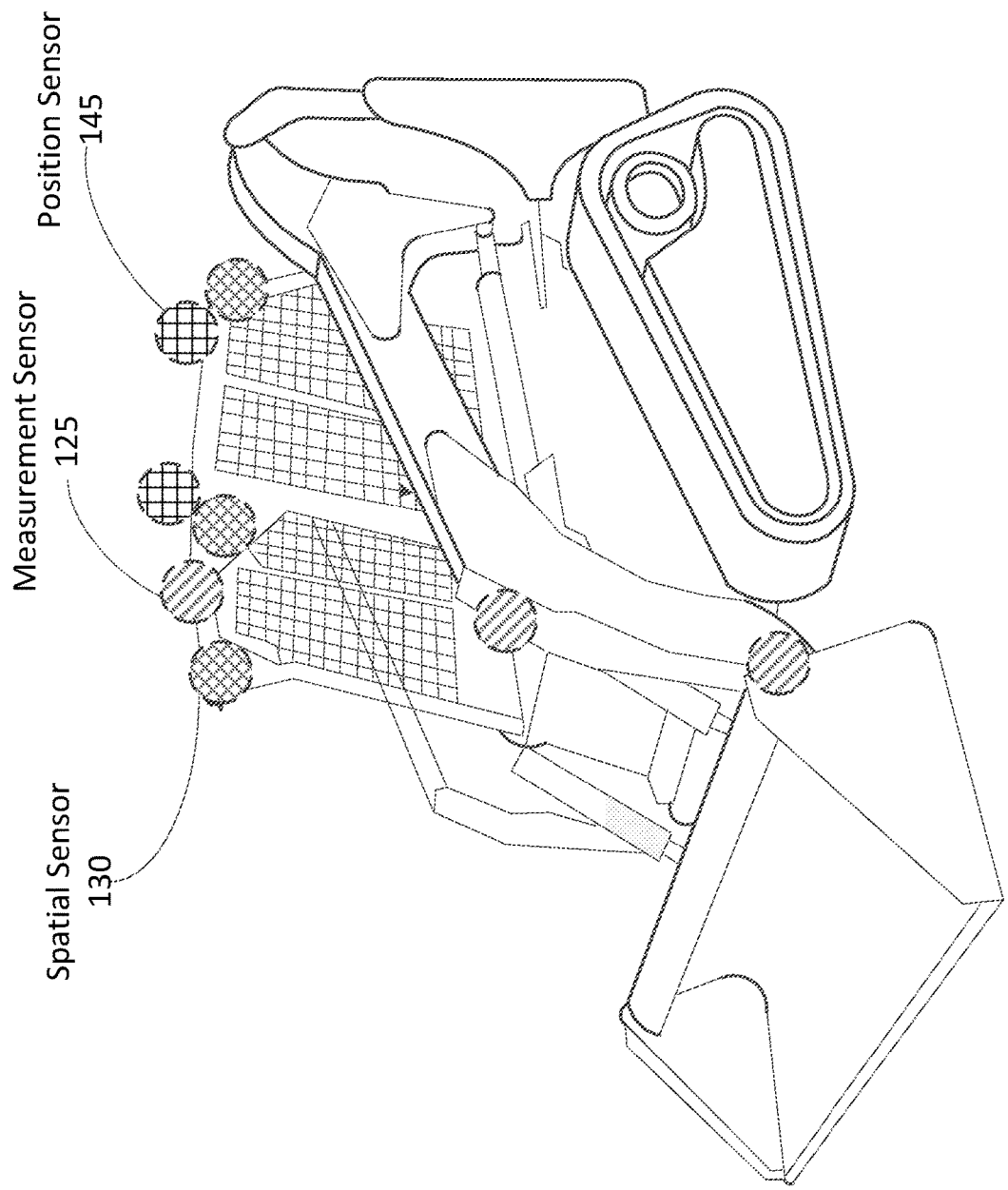
FIG. 2A illustrates an example placement of sensors for a compact track loader, according to one embodiment.
Figure 2B:
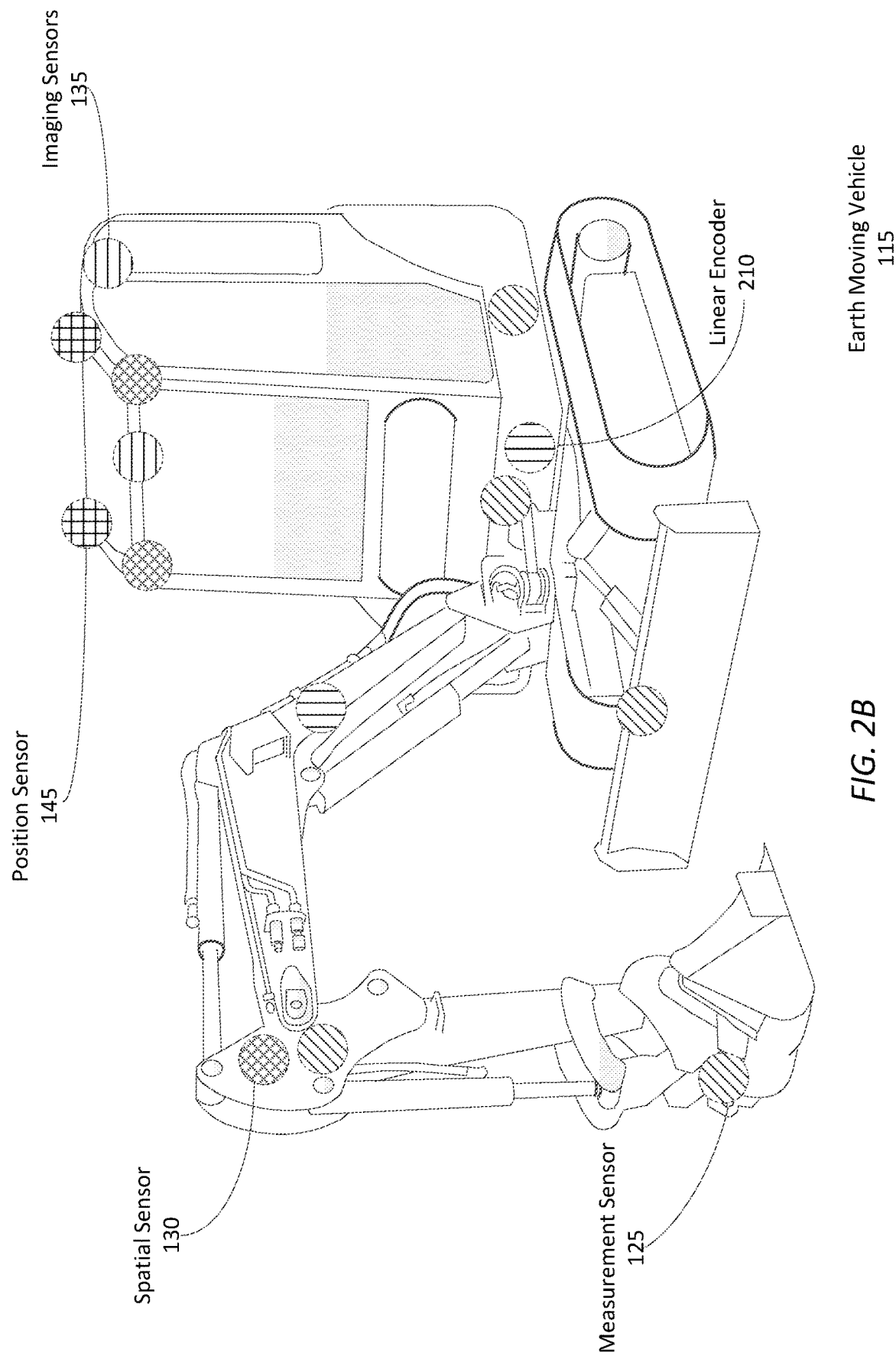
FIG. 2B illustrates an example placement of sensors for an excavator, according to one embodiment.

The earth moving system 100 uses a suite of one or more sensors 170 mounted on an earth moving vehicle 115 to record data describing the state of the earth moving vehicle 115 and the dig site. As examples, FIGS. 2A and 2B illustrate the example placement of sensors for a compact track loader and an excavator, respectively, according to example embodiments. FIGS. 1-2B are discussed together in the following section for clarity.

The earth moving system 100 includes a set of components physically coupled to the earth moving vehicle 115. These include a sensor assembly 110, the earth moving vehicle 115 itself, a digital or analog electrical controller 150, and an on-unit computer 120a. The sensor assembly 110 includes one or more of any of the following types of sensors: measurement sensors 125, spatial sensors 130, imaging sensors 135, and position sensors 145.

Each of these components will be discussed further below in the remaining sub-sections of FIG. 1. Although FIG. 1 illustrates only a single instance of most of the components of the earth moving system 100, in practice more than one of each component may be present, and additional or fewer components may be used different than those described herein.

I.A. Earth Moving Vehicle

The earth moving vehicle 115 is an item of heavy equipment designed to excavate earth from a hole within a dig site. Earth moving vehicles 115 are typically large and capable of moving large volumes of earth at a single time, particularly relative to what an individual human can move by hand. As described herein, earth moving refers generally to moving or shaping earth or materials within a dig site, for example digging a hole, filling a hole, leveling a mound, excavating, or depositing a volume of earth or materials from a first location to a second location. Materials, for example pieces of wood, metal, or concrete, may be moved using a forklift or other functionally similar machines. Generally, earth moving vehicles 115 excavate earth by scraping or digging earth from beneath the ground surface. Examples of earth moving vehicles 115 within the scope of this description include, but are not limited to, loaders such as backhoe loaders, track loaders, wheel loaders, skid steer loaders, scrapers, graders, bulldozers, compactors, excavators, mini-excavators, trenchers, and skip loaders.

Among other components, earth moving vehicles 115 generally include a chassis, a drive system, an earth moving tool 175, an engine (not shown), an on-board sensor assembly 110, and a controller 150. The chassis is the frame upon which all other components are physically mounted. The drive system 210 gives the earth moving vehicle 115 mobility through the dig site. The earth moving tool 175 includes not only the instrument collecting dirt, such as a bucket or shovel, but also any articulated elements for positioning the instrument for the collection, measurement, and dumping of dirt. For example, in an excavator or loader, the earth moving tool 175 refers not only the bucket but also the multi-element arm that adjusts the position and orientation of the tool.

The engine powers both the drive system and the earth moving tool 175. The engine may be an internal combustion engine, or an alternative power plant, such as an electric motor or battery. In many earth moving vehicles 115, the engine powers the drive system and the earth moving tool 175 commonly through a single hydraulic system, however other means of actuation may also be used. A common property of hydraulic systems used within earth moving vehicles 115 is that the hydraulic capacity of the earth moving vehicle 115 is shared between the drive system and the earth moving tool 175. In some embodiments, the instructions and control logic for the earth moving vehicle 115 to operate autonomously and semi-autonomously includes instructions relating to determinations about how and under what circumstances to allocate the hydraulic capacity of the hydraulic system.

I.B. Sensor Assembly

As introduced above, the sensor assembly 110 includes a combination of one or more of: measurement sensors 125, spatial sensors 130, imaging sensors 135, and position sensors 145. The sensor assembly 110 is configured to collect data related to the earth moving vehicle 115 and environmental data surrounding the earth moving vehicle 115. The controller 150 is configured to receive the data from the assembly 110 and carry out the instructions of an earth moving routine provided by the computers 120 based on the recorded data. This includes controlling the drive system to move the position of the tool based on the environmental data, a location of the earth moving vehicle 115, and the earth moving routine.

Sensors 170 are either removably mounted to the earth moving vehicle 115 without impeding the operation of the earth moving vehicle 115, or each sensor is an integrated component that is a native part of the earth moving vehicle 115 as made available by its manufacturer. Each sensor transmits the data, in real-time or as soon as a network connection is achieved, automatically without input from the earth moving vehicle 115 or a human operator. Data recorded by the sensors 170 is used by the controller 150 and/or on-unit computer 120a for analysis of, generation of and carrying out of earth moving routines, among other tasks.

Position sensors 145 provide a position of the earth moving vehicle 115. This may be a localized position within a dig site, or a global position with respect latitude/longitude, or some other external reference system. In one embodiment, a position sensor is a global positioning system interfacing with a static local ground-based GPS node mounted to the earth moving vehicle 115 to output a position of the earth moving vehicle 115.

Spatial sensors 130 output a three-dimensional map in the form of a three-dimensional point cloud representing distances between one meter and fifty meters between the spatial sensors 130 and the ground surface or any objects within the field of view of each spatial sensor 130, in some cases per rotation of the spatial sensor 130. In one embodiment, spatial sensors 130 include a set of light emitters (e.g., Infrared (IR)) configured to project structured light into a field near the earth moving vehicle 115, a set of detectors (e.g., IR cameras), and a processor configured to transform data received by the infrared detectors into a point cloud representation of the three-dimensional volume captured by the infrared detectors as measured by structured light reflected by the environment. In one embodiment, the spatial sensor 130 is a LIDAR sensor having a scan cycle that sweeps through an angular range capturing some or all of the volume of space surrounding the earth moving vehicle 115. Other types of spatial sensors 130 may be used, including time-of-flight sensors, ultrasonic sensors, and radar sensors.

Imaging sensors 135 capture still or moving-video representations of the ground surface, objects, and environment surrounding the earth moving vehicle 115. Examples of imaging sensors 135 include, but are not limited to, stereo RGB cameras, structure from motion cameras, and monocular RGB cameras. In one embodiment, each image sensor 135 can output a video feed containing a sequence of digital photographic images at a rate of 20 Hz. In one embodiment, multiple imaging sensors 135 are mounted such that each imaging sensor 135 captures some portion of the entire 360-degree angular range around the vehicle. For example, front, rear, left lateral, and right lateral imaging sensors 135 may be mounted to capture the entire angular range around the earth moving vehicle 115.

Measurement sensors 125 generally measure properties of the ambient environment, or properties of the earth moving vehicle 115 itself. These properties may include tool position/orientation, relative articulation of the various joints of the arm supporting the tool, vehicle 115 speed, ambient temperature, hydraulic pressure (either relative to capacity or absolute) including how much hydraulic capacity is being used by the drive system and the excavation tool separately. A variety of possible measurement sensors 125 may be used, including hydraulic pressure sensors, linear encoders, radial encoders, inertial measurement unit sensors, incline sensors, accelerometers, strain gauges, gyroscopes, and string encoders.

There are a number of different ways for the sensor assembly 110 generally and the individual sensors specifically to be constructed and/or mounted to the earth moving vehicle 115. This will also depend in part on the construction of the earth moving vehicle 115. Using the compact track loader of FIG. 2A as an example, the representations with diagonal crosshatching represent the example placements of a set of measurement sensors 125, the representation with diamond crosshatching represent example placements of a set of spatial sensors 130, and the representations with grid crosshatching represent example placements of a set of position sensors 145. Using the excavator shown in FIG. 2B as another example, diagonal crosshatchings represent measurement sensors 125, diamond crosshatchings represent spatial sensors 130, and grid crosshatchings represent position sensors 145. Additionally, vertical crosshatchings near the drive system represent example placements for a linear encoder 210 and horizontal crosshatchings near the roof represent imaging sensors 135, for example RGB cameras.

Generally, individual sensors as well as the sensor assembly 110 itself range in complexity from simplistic measurement devices that output analog or electrical systems electrically coupled to a network bus or other communicative network, to more complicated devices which include their own onboard computer processors, memory, and the communications adapters (similar to on-unit computer 120a). Regardless of construction, the sensors and/or sensor assembly together function to record, store, and report information to the computers 120. Any given sensor may record or the sensor assembly may append to recorded data a time stamp for when data was recorded.

The sensor assembly 110 may include its own network adapter (not shown) that communicates with the computers 120 either through either a wired or wireless connection. For wireless connections, the network adapter may be a Bluetooth Low Energy (BTLE) wireless transmitter, infrared, or 802.11 based connection. For wired connection, a wide variety of communications standards and related architecture may be used, including Ethernet, a Controller Area Network (CAN) Bus, or similar.

In the case of a BTLE connection, after the sensor assembly 110 and on-unit computer 120a have been paired with each other using a BLTE passkey, the sensor assembly 110 automatically synchronizes and communicates information relating to excavation of a dig site to the on-unit computer 120a. If the sensor assembly 110 has not been paired with the on-unit computer 120a prior to the excavation of a dig site, the information is stored locally until such a pairing occurs. Upon pairing, the sensor assembly 110 communicates any stored data to the on-site computer 120a.

The sensor assembly 110 may be configured to communicate received data to any one of the controller 150 of the earth moving vehicle 115, the on-unit computer 120a, or the off-unit computer 120b (including the off-unit controller 150b). For example, if the network adapter of the sensor assembly 110 is configured to communicate via a wireless standard such as 802.11 or LTE, the network adapter may exchange data with a wireless access point such as a wireless router, which may in turn communicate with the off-unit computer 120b and also the on-unit computer 120a. This type of transmission may be redundant, but it can help ensure that recorded data arrives at the off-unit computer 120b for consumption and decision making by a manual operator, while also providing the data to the on-unit computer 120a for autonomous or semi-autonomous decision making in the carrying out of an earth moving routine.

I.C. On-Unit Computer

Data collected by the sensors 170 is communicated to the on-unit computer 120a to assist in the design or carrying out of an earth moving routine. Generally, earth moving routines are sets of computer program instructions that, when executed, control the various controllable inputs of the earth moving vehicle 115 to carry out an earth moving-related task. The controllable input of the earth moving vehicle 115 may include a joystick controlling the drive system and excavation tool and any directly-controllable articulable elements, or some controller 150 associated input to those controllable elements, such as an analog or electrical circuit that responds to joystick inputs.

Generally, earth moving-related tasks and earth moving routines are broadly defined to include any task that can be feasibly carried out by an earth moving routine. Examples include but are not limited to: dig site preparation routines, digging routines, fill estimate routines, volume check routines, dump routines, wall cutback routines, and backfill/compaction routines. Examples of these routines are described further below. In addition to instructions, earth moving routines include data characterizing the dig site and the amount and locations of earth to be moved or excavated. Examples of such data include, but are not limited to, a digital file, sensor data, a digital terrain model, and one or more tool paths. Examples of such data are further described below.

The earth moving vehicle 115 is designed to carry out the set of instructions of an earth moving routine either entirely autonomously or semi-autonomously. Here, semi-autonomous refers to an earth moving vehicle 115 that not only responds to the instructions but also to a manual operator. Manual operators of the earth moving vehicle 115 may be monitor the earth moving routine from inside of the earth moving vehicle 115 using the on-unit computer 120a or remotely using an off-unit computer 120b from outside of the earth moving vehicle 115, on-site, or off-site. Manual operation may take the form of manual input to the joystick, for example. Sensor data is received by the on-unit computer 120a and assists in the carrying out of those instructions, for example by modifying exactly what inputs are provided to the controller 150 in order to achieve the instructions to be accomplished as part of the earth moving routine.

The on-unit computer 120a may also exchange information with the off-unit computer 120b and/or other earth moving vehicles 115 (not shown) connected through network 105. For example, an earth moving vehicle 115 may communicate data recorded by one earth moving vehicle 115 to a fleet of additional earth moving vehicles 115 that may be used at the same site. Similarly, through the network 105, the computers 120 may deliver data regarding a specific site to a central location from which the fleet of earth moving vehicles 115 are stored. This may involve the earth moving vehicle 115 exchanging data with the off-unit computer 120b, which in turn can initiate a process to generate the set of instructions for excavating the earth and to deliver the instructions to another earth moving vehicle 115. Similarly, the earth moving vehicle 115 may also receive data sent by other sensor assemblies 110 of other earth moving vehicles 115 as communicated between computers 120 over the network 105.

The on-unit computer 120a may also process the data received from the sensor assembly 110. Processing generally takes sensor data that in a "raw" format may not be directly usable and converts the sensor data into a form that useful for another type of processing. For example, the on-unit computer 120a may fuse data from the various sensors into a real-time scan of the ground surface of the dig site around the earth moving vehicle 115. This may comprise fusing the point clouds from various spatial sensors 130, the stitching of images from multiple imaging sensors 135, and registration of images and point clouds relative to each other or relative to data regarding an external reference frame as provided by position sensors 145 or other data. Processing may also include up sampling, down sampling, interpolation, filtering, smoothing, or other related techniques.

I.D. Off-Unit Computer

The off-unit computer 120b includes a software architecture for supporting access and use of the earth moving system 100 by many different earth moving vehicles 115 through network 105, and thus at a high level can be generally characterized as a cloud-based system. Any operations or processing performed by the on-unit computer 120a may also be performed similarly by the off-unit computer 120b.

In some instances, the operation of the earth moving vehicle 115 is monitored by a human operator. Human operators, when necessary, may halt or override an automated earth moving process and manually operate the earth moving vehicle 115 in response to observations made regarding the features or the properties of the dig site. Monitoring by a human operator may include remote oversight of the whole earth moving routine or a portion of it. Human operation of the earth moving vehicle 115 may also include manual control of the joysticks of the earth moving vehicle 115 for portions of the earth moving routine (i.e., preparation routine, digging routine, etc.). Additionally, when appropriate, human operators may override all or a part of the set of instructions and/or earth moving routine carried out by the on-unit computer 120a.

I.E. General Computer Structure

The on-unit 120a and off-unit 120b computers may be generic or special purpose computers. A simplified example of the components of an example computer according to one embodiment is illustrated in FIG. 3.

Figure 3:
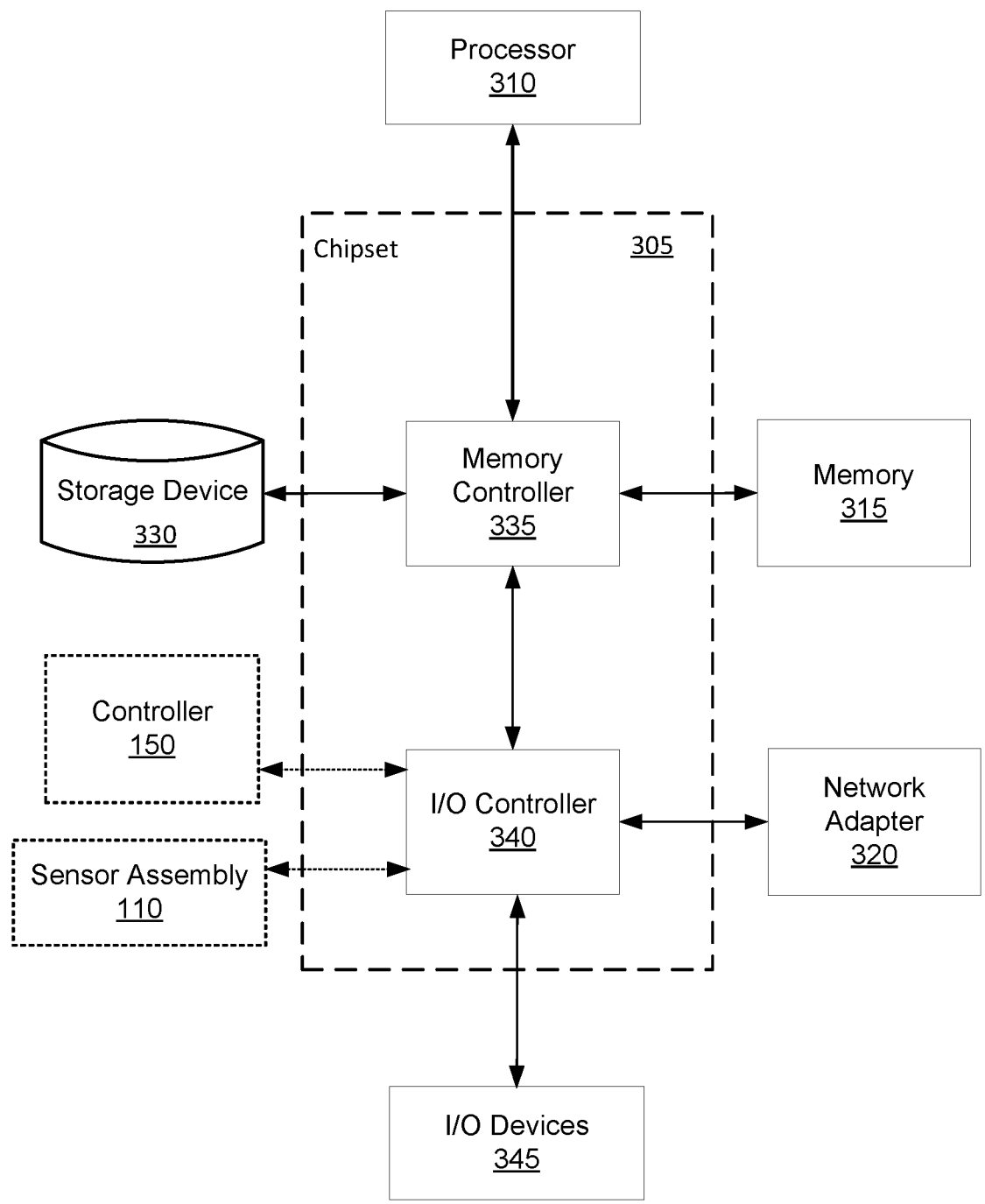
FIG. 3 is a high-level block diagram illustrating an example of a computing device, according to one embodiment.

FIG. 3 is a high-level block diagram illustrating physical components of an example off-unit computer 120b from FIG. 1, according to one embodiment. Illustrated is a chipset 305 coupled to at least one processor 310. Coupled to the chipset 305 is volatile memory 315, a network adapter 320, an input/output (I/O) device(s) 345, and a storage device 330 representing a non-volatile memory. In one implementation, the functionality of the chipset 305 is provided by a memory controller 335 and an I/O controller 340. In another embodiment, the memory 315 is coupled directly to the processor 310 instead of the chipset 305. In some embodiments, memory 315 includes high-speed random access memory (RAM), such as DRAM, SRAM, DDR RAM or other random access solid state memory devices.

The storage device 330 is any non-transitory computer-readable storage medium, such as a hard drive, compact disk read-only memory (CD-ROM), DVD, or a solid-state memory device. The memory 315 holds instructions and data used by the processor 310. The I/O controller 340 is coupled to receive input from the machine controller 150 and the sensor assembly 110, as described in FIG. 1, and displays data using the I/O devices 345. The I/O device 345 may be a touch input surface (capacitive or otherwise), a mouse, track ball, or other type of pointing device, a keyboard, or another form of input device. The network adapter 320 couples the off-unit computer 120b to the network 105.

As is known in the art, a computer 120 can have different and/or other components than those shown in FIG. 2. In addition, the computer 120 can lack certain illustrated components. In one embodiment, a computer 120 acting as server may lack a dedicated I/O device 345. Moreover, the storage device 330 can be local and/or remote from the computer 120 (such as embodied within a storage area network (SAN)), and, in one embodiment, the storage device 330 is not a CD-ROM device or a DVD device. Generally, the exact physical components used in the on-unit 120a and off-unit 120b computers will vary. For example, the on-unit computer 120a will be communicatively coupled to the controller 150 and sensor assembly 110 differently than the off-unit computer 120b.

Typically, the off-unit computer 120b will be a server class system that uses powerful processors, large memory, and faster network components compared to the on-unit computer 120a, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit computer 120b and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer 120 is adapted to execute computer program modules for providing functionality described herein. A module can be implemented in hardware, firmware, and/or software. In one embodiment, program modules are stored on the storage device 330, loaded into the memory 315, and executed by the processor 310.

I.F. Network

The network 105 represents the various wired and wireless communication pathways between the computers 120, the sensor assembly 110, and the earth moving vehicle 115. The network 105 uses standard Internet communications technologies and/or protocols. Thus, the network 105 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 105 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Earth Moving Vehicle Operation Overview

Figure 4:
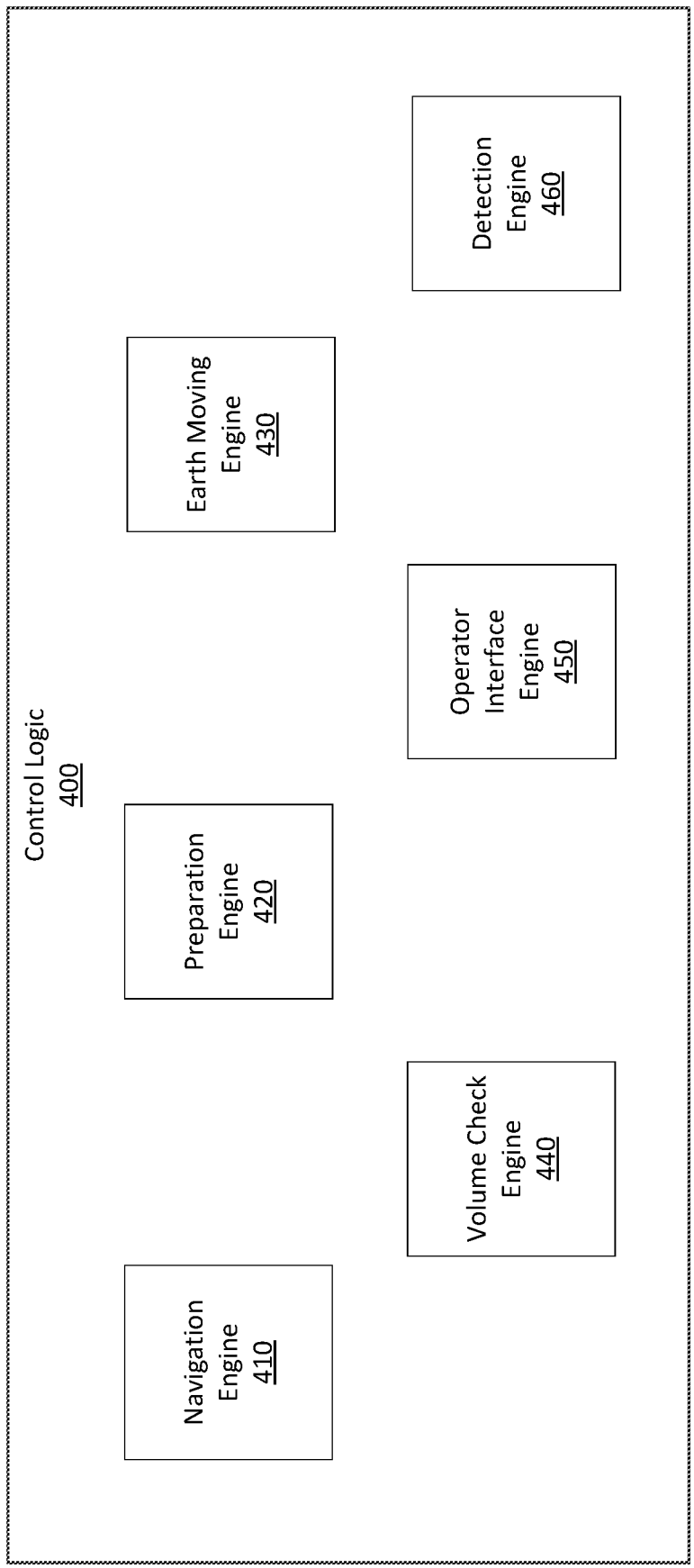
FIG. 4 is a high-level block diagram of the system architecture for a control system of an earth moving vehicle, according to one embodiment.

FIG. 4 is a diagram of the system architecture for the control logic 400 of an earth moving vehicle 115, according to an embodiment. The control logic 400, an embodiment of the controller 150, is implemented by s software within a central computer, for example an on-unit computer 120*a* or the off-unit computer 120*b*, and is executed by providing inputs to the controller 150 to control the control inputs of the earth moving vehicle 115 such as the joystick. The system architecture of the control logic 400 comprises a navigation engine 410, a preparation engine 420, an earth moving engine 430, a volume check engine 440, an operator interface engine 450, and a detection engine 460. In other embodiments, the control logic 400 may include more or fewer components. Functionality indicated as being performed by a particular engine may be performed by other engines instead.

The navigation engine 410 provides mapping and orientation instructions to a drivetrain of the earth moving vehicle 115 to navigate the earth moving vehicle 115 through the coordinate space of the dig site and along target tool paths to perform earth moving routines. The preparation engine 420 creates and/or converts a digital file describing a target state of the dig site into a set of target tool paths. In combination, the set of target tool paths describes an earth moving routine and an organizational layout of the dig site along with any other instructions needed to carry out the earth moving routine (e.g., a location of earth to be moved, a location at which earth is to be filled, and a location of other vehicles relative to a primary vehicle). The preparation engine 420 is further described with reference to FIGS. 5A and 5B.

The earth moving engine 430 executes instructions (e.g., instructions encoded as a set of target tool paths) to actuate one or more tools 175 and the drive train to perform an earth moving routine, for example an earth moving routine to excavate earth from a location in a dig site, a filling routine to fill earth at a location in the dig site, or a hauling routine to move earth from one location to another in the dig site. The earth moving engine 430 will be further discussed with reference to FIGS. 6A-6C.

The volume check engine 440 measures the amount of earth in an earth moving tool 175, for example an earth moving tool 175 coupled to an earth moving vehicle 115 or a hauling tool coupled to a hauling vehicle, and makes a determination regarding whether or not the earth moving vehicle 115 should release the contents of the tool or continue performing an earth moving routine. The volume check engine 440 will be further discussed with reference to FIGS. 7A and 7B.

The operator interface engine 450 generates a graphical user interface for presentation to a remote operator on a computing device. The operator interface engine 450 generates various graphical user interfaces or graphic elements that provide the remote operator with insight into the progress of an earth moving routine, the condition of the earth moving vehicle 115 performing the routine, and the surrounding area and ground surface of the dig site. The operator interface engine 450 may additionally enable the remote operator to manually initialize a target tool path and communicate the initialized target tool path to an earth moving vehicle. Based on feedback from the earth moving vehicle 115 performing operations outlined by a target tool path, the operator interface engine 450 may generate graphical user interfaces for the operator to modify the tool path in real-time. In any of the implementations described above, the operator interface engine 450 receives interactive input from the remote operator, for example touch input directly on a screen of the computing device or keystrokes via a keyboard of the computing device. Inputs from the operator cause the operator interface engine 450 to perform processing functions including, but not limited to, generating a new graphical user interface, updating an existing graphical user interface, and displaying the graphical user interface on the computing device. In alternate embodiments, the operator interface engine 450 may be a component of the computing device controlled by the operator. In such embodiments, the operator interface engine 450 may be communicatively coupled with the 150 on-board the vehicle 115.

The detection engine 460 determines a state of the earth moving vehicle 115 or dig site as the earth moving vehicle 115 performs earth moving routines or operations. The detection engine 460 determines actions for the earth moving vehicle 115 to take based on the state. The detection engine is further described in relation to FIGS. 8A-B.

For the sake of simplicity, functionality of the control logic 400 is described within the context of an earth moving vehicle, however such functionality may be applied to any earth moving vehicle 115, for example a compacting vehicle or a hauling vehicle.

III. Preparing Instructions for an Earth Moving Routine

Figure 5A:
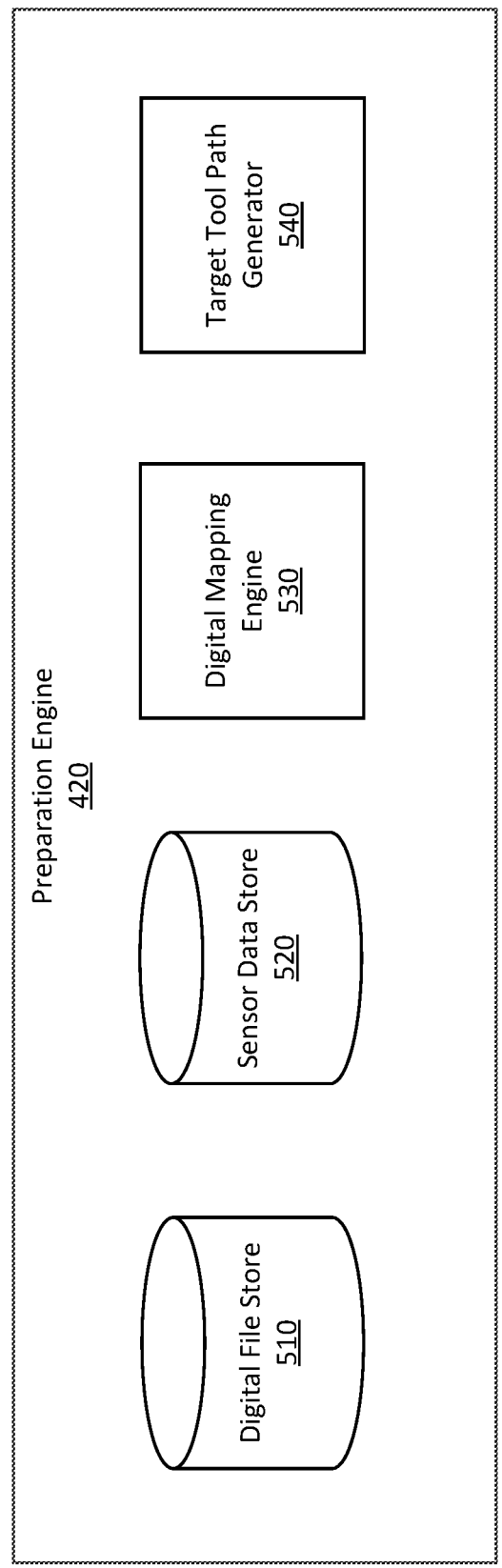
FIG. 5A is a high-level block diagram of a preparation engine, according to one embodiment.

FIG. 5A is a high-level block diagram of a preparation engine, according to one embodiment. Prior to an earth moving vehicle 115 performing operations to navigate through the dig site and excavate earth from a dig location, the controller 150 generates the operations to be performed by the earth moving vehicle 115, also referred to as a target tool path, based on a known target state of the dig site and contextual data describing the initial state of the dig site.

FIG. 5A is a diagram of the system architecture for the preparation engine 420 of a central computer 120, according to an embodiment. The preparation engine 420 generates a digital terrain model including one or more target tool paths which can be followed by the earth moving vehicle 115. The system architecture of the preparation engine 420 comprises a digital file store 510, a sensor data store 520, a digital mapping engine 530, and a target tool path generator 540. In other embodiments, the preparation engine 420 may include more or fewer components. Functionality indicated as being performed by a particular engine may be performed by other engines instead. Some of the engines of the preparation engine 410 may be stored in the control logic 400.

As described herein, a target tool path represents operations for an earth moving vehicle 115 to perform to move or shape a volume of earth in the dig site. Examples of such operations include, but are not limited to, routines for excavating earth from a location in the dig site, hauling earth from one location to another in the dig site, filling or depositing earth excavated from one location at another, and compacting or grading earth in the dig site. The operations may also include instructions for actuating an earth moving tool 175 to move earth in the dig site. For example, a target tool path for an excavation operation, includes instructions to actuate an excavation tool beneath a ground surface and to maintain the position of the earth moving tool 175 beneath the ground surface until the earth moving tool 175 is filled with earth. That same target tool path may additionally include instructions to raise the position of the earth moving tool 175 above the ground surface to measure the volume of earth. Additionally, a target tool path may include instructions to adjust a position and an orientation of an earth moving tool 175 before, after, or during the performance of an earth moving operation or earth moving routine. For example, a target tool path for an earth moving operation, includes instructions to adjust an orientation of a earth moving tool 175 to effectively penetrate the ground surface, to maximize the volume of earth collected in the earth moving tool 175, to achieve a breakout angle, or a combination thereof. The target tool path may additionally include navigation instructions, for example a set of coordinates in a coordinate space representing the dig site, for the earth moving vehicle 115 to navigate along a route between a start point and an end point in the dig site.

The digital file store 510 maintains one or more digital files, which may be accessed from a remote database. In some instances, the controller 150 may access these digital files from the central computer 120b and subsequently store them in the digital file store 510. Digital files may be image files describing the geographic layout of the dig site as a function of location within a coordinate space of the dig site, with different images representing a dig location, fill location, an entry ramp, etc. Geographic locations in the coordinate space may be represented as one or more two-dimensional points or three-dimensional points. The digital file may also include data describing how the earth moving vehicle 115 ought to interact with each location discussed in the digital file. The digital files stored in the digital file store 510 may also include a digital file representing a target state of the dig site once all earth moving routines have been completed. Digital files may be constructed using known computer programs and file types, such as a Computer Aided Design (CAD) file or a Building Information Modeling (BIM) file.

For example, a dig location may be characterized by a set of target volume dimensions which should be achieved upon the conclusion of an earth moving routine. At a boundary of the dig location, the digital file may also include a ramp. Geometrically, the width of the ramp is generally greater than the maximum width of the combination of the earth moving vehicle 115 and the earth moving tool 175 coupled to the earth moving vehicle 115. Additionally, the location of the fill location may be extracted from the digital file or received manually from a human operator. Alternatively, the location of the fill location within the dig site may be based on the estimated maximum size of the fill location and a specified relative distance between the fill location, the dig location, and other equipment in the dig site. The placement of the fill location may also be determined based on several considerations including, but not limited to: the risk of excavated earth caving in above the dig location or the fill location, the volume of excavated earth required to form the planned hole, the estimated compaction factor of the excavated earth, and the estimated swell factor of the excavated earth.

When appropriate, the digital file may also describe the location of fiducials representing technical pieces of equipment previously placed at the dig site such as stakes with active emitters and grade stakes. In alternate instances, the locations of the fiducials may be manually input to a central computer 120 based on the records of a human operator.

The preparation engine 420 generates a representation of the initial state of the dig site using sensor 170 data, stored within the sensor data store 520. As the navigation engine 410 maneuvers the earth moving vehicle 115 through the dig site, sensors 170 gather contextual information on the dig site which is aggregated into a representation of the current state of the dig site. More specifically, spatial sensors 130 record spatial data in the form of point cloud representations, imaging sensors 135 gather imaging data, and depth sensors 145 gather data describing relative locations. More generally, the sensor data store 520 stores contextual information describing the current state of the dig site which refers to a physical landscape of the dig site and physical properties of soil, or earth, within the dig site. The navigation engine 410 navigates within the geospatial boundaries defined by the digital file to record contextual information describing the current state of the dig site.

When recording data via one or more spatial sensors, the spatial sensors 130 record one or more photographic images of various portions of the dig site. Based on the photographic images, the preparation engine 420 generates a representation of a current physical state of the dig site by stitching the recorded images into point clouds of data representing the portions of the dig site. Additionally, for each of the recorded images, the preparation engine 420 records and translates the position and orientation of features within the dig site into the point cloud representations with respect to the coordinate space of the digital file. In alternative implementations, the sensor assembly 110 uses an imaging sensor 135 to record the contextual information as photographic images of portions of the dig site and, for each of those images, stores the associated positions and orientations of the relevant features within the photographed portion of the dig site. Additionally, for each of the recorded images, the preparation engine 420 records and translates the position and orientation of features within the dig site into the point cloud representations with respect to the coordinate space of the digital file. In another alternate implementation, the sensor assembly 110 uses an imaging sensor 135 to record the contextual information as photographic images of portions of the dig site and, for each of those images, stores the associated positions and orientations of the relevant features within the portion of the dig site. Alternatively, the earth moving vehicle 115 includes sensors and a software assembly that generates a digital terrain model of the dig site using simultaneous localization and mapping (SLAM).

Using the representation of a current physical state of the dig site generated based on the sensor data and the representation of the target state of the dig site, the digital mapping engine 530 generates a digital terrain model of the dig site. By aligning points in the target state of the dig site with the initial state of the dig site in the coordinate space, the digital mapping engine 530, or alternatively the central computer 120, identifies differences between the two representations. For example, the digital mapping engine 530 may determine a volume of earth to be excavated to form the planned hole from the digital file. In one embodiment, digital mapping engine 530 aligns (or registers) the two representations (the digital file and the contextual data) using the known locations of fiducials and other locations within the dig site common to both representations. Position data from a position sensor 145 such as a GPS or the boundaries of the dig sites provided by both representations may also be used by the digital mapping engine 530 to perform the alignment. The digital mapping engine 530 may additionally use algorithms, such as Iterative Closest Point (ICP) to align the two representations. In one embodiment, for every point pair in the actual/target representations, if the difference in elevation (e.g., Z-axis relative to the ground plane) is greater than a threshold, the digital mapping engine 530 multiplies the difference in elevation by the resolution of the representation to calculate a voxel volume, and is then summed together. The digital mapping engine 530 may perform such a technique at multiple points to determine how the two representations should be adjusted relative to each other along an axis to align them.

In some implementations, the preparation engine 420, or alternatively the central computers 120, use the digital terrain model to determine the difference in volume between the two representations which translates into the volume of earth to be excavated from the hole. Incorporating all the considerations made above, the physical layout of the dig site, the volume of earth to be excavated, and the creation of cutbacks and slope backs, the preparation engine 420 generates one or more target tool paths.

Using the digital terrain model, the target tool path generator 540 generates one or more target tool paths for the earth moving vehicle 115 to move the earth moving tool 175, or a combination of earth moving vehicles 115 to move multiple earth moving tools 175, to perform an earth moving routine, for example excavating a volume of earth, filling a volume of earth, or navigating the earth moving vehicle 115 within the dig site. Tool paths provide instructions for a semi-autonomous vehicle to perform an earth moving routine in the form of geographical steps and corresponding coordinates for the earth moving vehicle 115 and/or coupled earth moving tool 175 to traverse within the dig site. In implementations where the dig site is represented in the digital terrain model as a coordinate space, for example the implementations described above, a target tool path includes a set of coordinates within the coordinate space. A target tool path may further represent a measure of volume relative to the volume of the planned hole. For example, if a hole is 4" wide, 3" long, and 2" deep, a single target tool path includes coordinates within the 12" area of the coordinate space and, at each coordinate, places the tool at a depth of 2" in order to excavate the hole using a single target tool path. Target tool paths may describe a variety of shapes representing a variety of earth moving techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface.

For holes of greater volumes or requiring a graded excavation, the target tool path generator 540 may generate multiple target tool paths at different offsets from the finish tool path. For example, if three target tool paths are required to excavate a 6" deep hole, the first may be performed at a depth of 3", the second at a depth 2", and the third at a depth of 1". As a result, a target tool path may represent instructions for excavating only a fraction of the volume of excavated earth. For example, the last tool path used at the conclusion of the excavation of the hole may be referred to as a finish tool path, which digs minimal to no volume, but is primarily intended to even the surface of the bottom of the dug hole. While moving through the finish tool path, the earth moving tool 175 excavates less earth from the hole than in previous tool paths by adjusting the depth of the leading edge or the angle of the earth moving tool 175 beneath the ground surface. To conclude the excavation of the hole, the earth moving vehicle 115 adjusts a non-leading edge of the earth moving tool 175 and reduces the speed of the drive. In some implementations, instructions included in each target tool path may be executed by a different earth moving vehicle 115, resulting in a fleet of earth moving vehicles 115 operating cooperatively to complete a task.

For holes of greater volumes that may require a graded excavation, the target tool path generator 540 may generate multiple tool paths at different offsets from the finish tool path. For example, if three tool paths are required to excavate a 6" deep hole, the first may be performed at a depth of 3", the second at a depth 2", and the third at a depth of 1". As a result, a tool path may represent only a fraction of the volume of excavated earth. In one embodiment, the target tool path generator 540 calculates the number of tool paths by dividing the target depth of the hole by the maximum depth that each tool path is capable of In some instances, the maximum depth that each tool path is capable of is also defined by the dimensions of the tool 175 attached to the earth moving vehicle 115. In other embodiments, the tool paths may be manually generated using the off-unit computer 120b as the central controller 120.

In some implementations, tool paths may not describe the shape of the hole in three-dimensions, instead removing the depth measurement to only specify a two-dimensional pathway or two-dimensional plane in the three or two-dimensional coordinate system. In such instances, the depth instructions for how deep to dig with a tool path may be provided to the controller 150 in a separate set of instructions.

The target tool path generator 540 may define tool paths are defined based on several factors including, but not limited to, the composition of the soil, the properties of the earth moving tool 175 being used to excavate the hole, the properties of the drive system moving the earth moving tool 175, and the properties of the earth moving vehicle 115. Example properties of the earth moving tool 175 and earth moving vehicle 115 include the size of the earth moving tool 175, the weight of the earth moving tool 175, and the force exerted on the earth moving tool 175 in contact with the ground surface of the dig site.

When performed in reverse or in alternative sequences, the processes described above and below with respect to trenching and drilling as specific examples may also perform other earth moving routines including, but not limited to, digging, grading, filling, trenching, compacting, aerating, ripping, stripping, spreading, and smoothing.

Figure 5B:
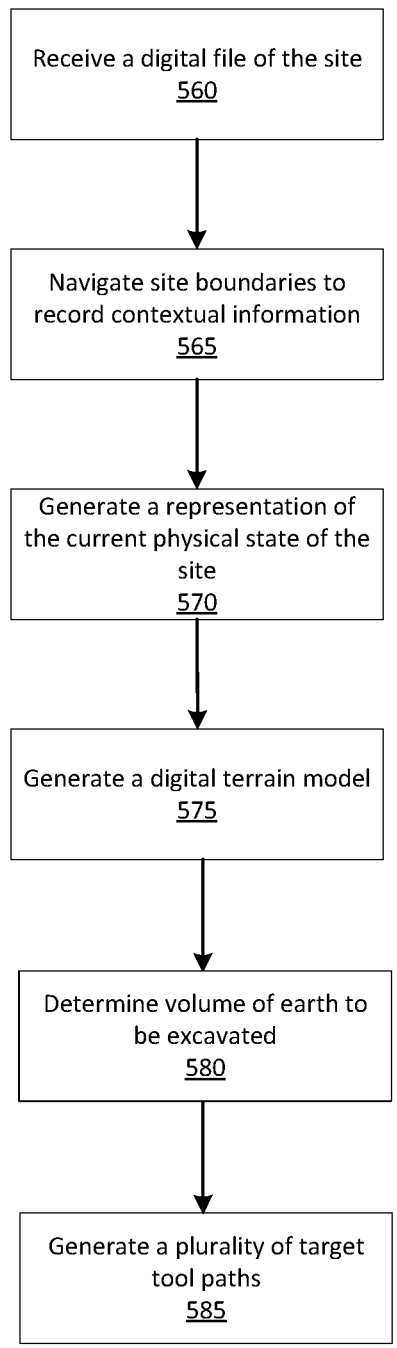
FIG. 5B shows an example flowchart describing a process for preparing a digital terrain model of a dig site, according to one embodiment.

To implement the system architecture of the preparation engine, FIG. 5B shows an example flowchart describing the process for a controller 120 to prepare a digital terrain model of the dig site, according to an embodiment. As described above, a digital file of the dig site detailing planned excavation of a hole and the area surrounding the hole is received 560 by the controller 150 and stored within the digital file store 510. In some instances, the controller 150 may access these digital files from a central computer 120 and subsequently store them in the digital file store 510.

The navigation engine 410 navigates 565 the earth moving vehicle 115 within the geospatial boundaries defined by the digital file to record contextual information describing the current state of the dig site. Contextual information refers to the physical landscape of the dig site and the physical properties of the soil within the dig site. The contextual information, stored in the data store 520, is recorded using the system of sensors, such as spatial sensors and imaging sensors. When recording data via one or more spatial sensors, the spatial sensors 130 record one or more photographic images of various portions of the dig site. The preparation engine 420 stitches the recorded images into one or more point clouds of data representing the portions of the dig site to generate 570 a representation of a current physical state of the dig site. Additionally, for each of the recorded images, the position and orientation of features within the dig site are recorded and translated into the point cloud representations with respect to the coordinate space of the digital file. In other implementations, the sensor assembly 110 uses an imaging sensor 135 to record the contextual information as photographic images of portions of the dig site and, for each of those images, stores the associated positions and orientations of the relevant features within the portion of the dig site. In another implementation, the earth moving vehicle 115 includes sensors and a software assembly that generates a digital terrain model of the dig site using simultaneous localization and mapping (SLAM).

Using the generated representation of a current physical state of the dig site and representation of the target state of site, the preparation engine 420 generates 575 a digital terrain model of the dig site. As described earlier, the digital mapping engine 530 aligns the digital terrain model by aligning the two representations using common features such as physical fiducials within the dig sites or the boundaries of the dig site.

Using the digital terrain model, the preparation engine 420 determines 580 the volume of earth to be excavated based on the differences between the representation of the current state of the dig site and the target state of the dig site. More specifically, using the digital terrain model, the central computer 120 determines the difference in volume between the two representations which translates into the volume of earth to be excavated from the hole. Incorporating all the considerations made above, the physical layout of the dig site, the volume of earth to be excavated, and the creation of cutbacks and slope backs, the preparation engine 420 generates 585 one or more target tool paths. Finally, the central computer 120 delivers a set of instructions, in the form of target tool paths, for controlling the earth moving tool 175 and the earth moving vehicle 115 to perform an earth moving routine or a part of an earth moving routine.

More information regarding the preparation of an earth moving routine and the generation of target tool paths outlining operations for performing the earth moving routine can be found in U.S. patent application Ser. No. 15/877,221 filed on Jan. 22, 2018, which is incorporated by reference herein in its entirety.

IV. Removing Earth from a Dig Location

IV.A Overview

Figure 6A:
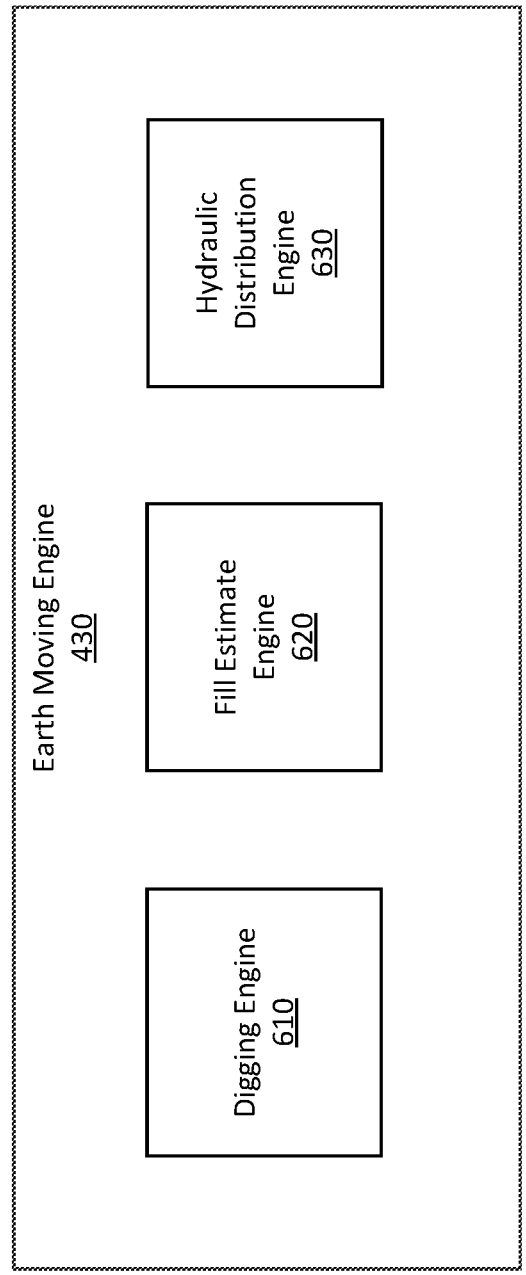
FIG. 6A is a high-level block diagram of an earth moving engine, according to one embodiment.

FIG. 6A is a diagram of the system architecture for the earth moving engine 430 of an earth moving vehicle 115, according to an embodiment. The earth moving engine 430 performs operations for guiding the tool through an earth moving routine, for example an excavation routine to excavate earth from the hole. The operations enable to the controller 150 to lower the earth moving tool 175 into contact with the ground surface and then advance (directly or indirectly by moving the entire earth moving vehicle 115 with the drive train) forward to excavate earth from the ground into the earth moving tool 175. The system architecture of the earth moving engine 430 comprises a digging engine 610, a fill estimate engine 620, and a hydraulic distribution engine 630. In other embodiments, the earth moving engine 430 may include more or fewer components. Functionality indicated as being performed by a particular engine may be performed by other engines instead. Some of the engines of the earth moving engine 430 may be stored in the control logic 400. For the sake of simplicity, functionality of the earth moving engine 430 is described within the context of an earth moving vehicle 115, however such functionality may be applied to any earth moving vehicle 115, for example a compacting vehicle or a hauling vehicle. Additionally, although earth moving routines are described in the context of moving or shaping earth in a dig site, such routines may be further applied to the moving of any material found in a dig site. Examples of such alternate materials include, but are not limited to, concrete, wood, supplies, equipment, other any other materials or objects found in a dig site.

The digging engine 610 performs a digging routine to excavate a volume of earth from a planned hole at a dig location consistent with a set of operations outlined in the form of a target tool path. The digging engine 610 performs a digging routine by accessing the one or more target tool paths for the digging routine, for example as generated by the preparation engine 420, and moves the tool 175 and/or earth moving vehicle 115 accordingly. The digging engine 610 may also continuously or periodically track the position of the earth moving tool 175 within the coordinate space using information obtained from the position sensor 145. In response to instructions from another engine attempting to carry out a digging routine (e.g., the digging engine 610), the hydraulic distribution engine 630 monitors and adjusts the distribution of hydraulic pressure from the engine that is allocated between the drive system and earth moving tool 175. In practice, the digging engine 610 may specify some vehicle or tool parameters to be maintained, such as the tool 175 breakout angle, and the hydraulic distribution engine 630 sets the hydraulic distribution between the tool 175 and drive system to maintain those parameters.

The fill estimate engine 620 determines an estimate of the volume of earth in-situ as the tool is moved over a target tool path. The fill estimate engine 620 compares the estimate to a threshold volume of earth and when the estimated volume is greater than the threshold volume, the fill estimate engine 620 interrupts the digging routine and raises the earth moving tool 175 above the ground surface and performs a check routine to better estimate the amount of earth currently in the earth moving tool 175.

The hydraulic distribution engine 630 monitors and adjusts the distribution of hydraulic pressure from the engine that is allocated between the drive system and earth moving tool 175. The hydraulic distribution engine 630 does this in response to instructions from another engine (such as the digging engine 610) attempting to carry out the digging routine, as control of the hydraulic pressure dictates the actuation of the earth moving tool 175 and movement of the earth moving vehicle 115. In practice, the digging engine 610 may specify some device parameter to be maintains, such as the earth moving tool 175 breakout angle, and the hydraulic distribution engine 610 sets the hydraulic distribution between the earth moving tool 175 and drive system to maintain that breakout angle. As described herein, a breakout angle refers to the threshold angle of the earth moving tool 175 at which the earth moving tool 175 is capable for breaking through the ground surface during a digging routine.

More information regarding the preparation of a digging routine and the generation of target tool paths outlining operations for performing the digging routine can be found in U.S. patent application Ser. No. 15/877,217 filed on Jan. 22, 2018, which is incorporated by reference herein in its entirety.

IV.B Earth Moving Routine

Figure 6B:
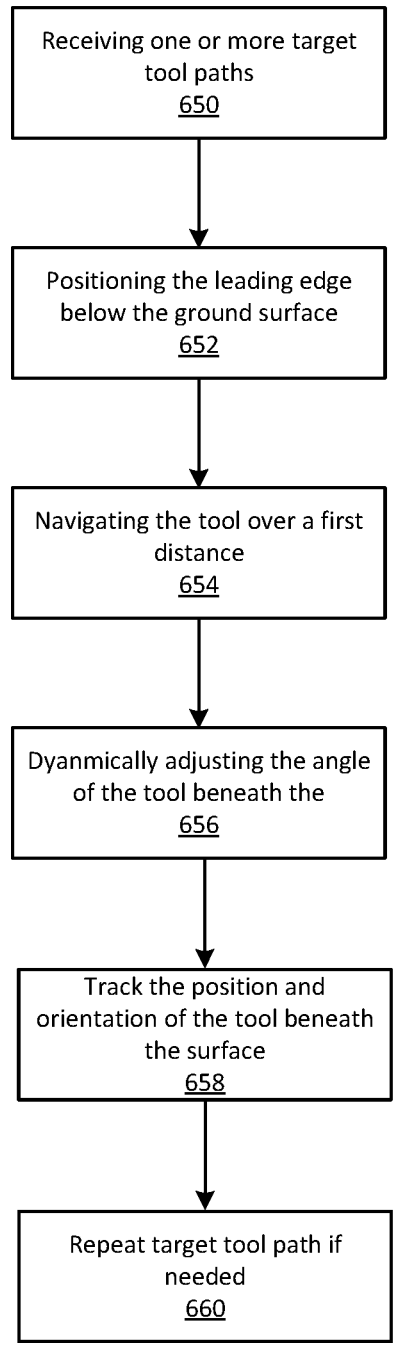
FIG. 6B is a flowchart describing a process for performing an earth moving routine, according to one embodiment.

In one implementation, the navigation engine 410 on an earth moving vehicle 115 moves an earth moving tool 175 forward through a dig location within the dig site to excavate earth from the dig location. FIG. 6B is a flowchart describing a process for an earth moving vehicle 115 to perform an earth moving routine, according to one embodiment. The earth moving engine 430 receives 650 the one or more target tool paths generated by the preparation engine 420 and positions 652 the leading edge of the earth moving tool 175 below the ground surface. The depth below the ground surface at which the earth moving tool 175 is placed is guided by the operations outlined in a target tool path.

In addition to defining the height at which the leading edge is lowered beneath the ground surface, the target tool path may also include instructions describing how a first distance for the navigation engine 410 to move the earth moving tool 175 without raising the earth moving tool 175 above the ground surface. Accordingly, the navigation engine 410 navigates 654 the earth moving tool 175 over the first distance. To maintain the movement of the earth moving tool 175 beneath the ground surface, the digging engine 610 dynamically adjusts 656 mechanical conditions of the earth moving vehicle 115 including, but not limited to, the angle of the earth moving tool 175 beneath the ground surface, the torque output of the engine system, and the true speed of the earth moving tool 175. The angle of the earth moving tool 175 beneath the ground surface can be adjusted to reduce the rate at which the earth moving tool 175 collects excavated earth. For example, when the earth moving tool 175 is angled perpendicular to the flat ground surface, the rate of excavation may be at its highest. Alternatively, when the earth moving tool 175 is angled parallel to the flat ground surface, the rate of excavation may be at its lowest. Additionally, at lower speeds, the earth moving tool 175 is generally often better able to maintain the angle optimal for excavating earth.

While moving through the earth moving routine at the dig location, the earth moving engine 430 tracks 658 the position and orientation of the earth moving tool 175 within the coordinate system using the position sensors 145 physically mounted on the earth moving vehicle 115 as described above in reference to FIGS. 2A-2D. The orientation of the earth moving tool 175, described with reference to the angle of the earth moving tool 175 relative to a reference orientation, is recorded using one or more position sensors 145. Examples of reference orientations include the ground surface, a gravity vector, or a target tool path. As the earth moving tool 175 moved along the target tool path, the soil may push the leading edge to a neutral to the angle of the reference orientation, at which point the earth moving tool 175 is raised above the ground surface.

As the digging engine 610 moves the earth moving tool 175 along a target tool path, soil friction and soil composition factors may result in tool deviating from the target tool path, creating an actual tool path that was travelled by the earth moving tool 175 or earth moving vehicle 115. Because of the deviation between the target tool path and the actual tool path, the actual tool path is associated with a different set of coordinates within the coordinate space than those associated with the target tool path. In one embodiment, the digging engine 610 repeats 660 the same target tool path until a deviation between the target tool path and the actual tool path is less than a threshold deviation, or until some other outcome is achieved, such as a threshold amount of earth is removed. Alternatively, if the deviation between the target tool path and the actual tool path is below a threshold deviation, the excavation tool performs the next portion of the earth moving routine which may be a check routine, a dump routine, or second (e.g., deeper) target tool path. Periodically while moving through the actual tool path, the digging engine 610 updates the tool fill level and records the speed of both the tool and the drive system. Based on these recorded considerations, the digging engine 610 either continues to move the earth moving tool 175 through the earth or interrupts the digging routine to perform a check routine. In response, the controller 150 may update the tool fill level, before continuing with the earth moving routine for the planned hole.

The digging engine 610 may also determine that the target tool path is obstructed by one or more obstacles, for example rocks, trees, roots, wooden beams, buried pipelines, cables, pieces of concrete, asphalt, and steel. Determinations regarding the presence of obstacles along the tool path are made based on occurrence of one or more of a set of conditions, including, but not limited to, an engine load greater than the target engine load, a ground speed lower than the minimum ground speed, and a tool angle lower than a target tool angle. These inputs may be received by the sensors 170 and passed to the central computer 120 for evaluation by the digging engine 610.

When an obstruction, for example an obstacle or another earth moving vehicle 115, is determined to be within the target tool path, the digging engine 610 may store the geospatial location of the obstacle, for example a current location of the earth moving vehicle 115 as provided by the position sensor 145, perform a dump routine to release earth from the earth moving tool 175, and return to the location of the obstacle within the dig site to perform a break routine to hopefully break up and/or remove the object. Break routines, in one embodiment, include instructions to the controller to repetitively drive the leading edge of the to earth moving tool 175 downward into the earth around the location of the obstacle, running the leading edge of the earth moving tool 175 over the location of the detected obstacle to "scrape" or loosen this earth, and activating an alternate tool (not shown) to break down the obstacle. In another embodiment, after determining that an obstacle lies within the target tool path, the earth removal engine 530 may halt the digging routine until a human operator can manually operate this 115 or another earth moving vehicle 115 to remove the object.

In addition to finishing target tool paths and possibly separately from a digging routine, the digging engine 610 may perform a grading routine to perform grading tasks. A grading routine may, for example, include moving the earth moving tool 175 forward through the hole to grade the ground surface of the hole, where the earth moving tool 175 is set at a shallow or zero depth position relative to the aggregate or average ground plane. At such a shallow depth, the earth moving tool 175 requires less forward force from the drive system to move the earth moving tool 175 forward than when the earth moving tool 175 is lowered to a greater, digging-oriented depth. This allows the earth moving vehicle 115 to implement an earth moving tool 175 suited to grading, such as an earth moving tool 175 of greater volume relative to a digging routine oriented tool, which would be able to hold a greater amount of earth within the mechanical and hydraulic constraints of the earth moving vehicle 115 and while also requiring fewer dump routines for dumping excess graded earth. Grading of the ground surface may result in an uneven ground surface when the earth moving tool 175 moves in a first direction, so the digging engine 610 may further cause the earth moving tool 175 to be moved in a reverse direction and possibly further cause the earth moving tool 175 to repeat movement over the previously graded earth.

IV.C Fill Level Estimate Routine

Figure 6C:
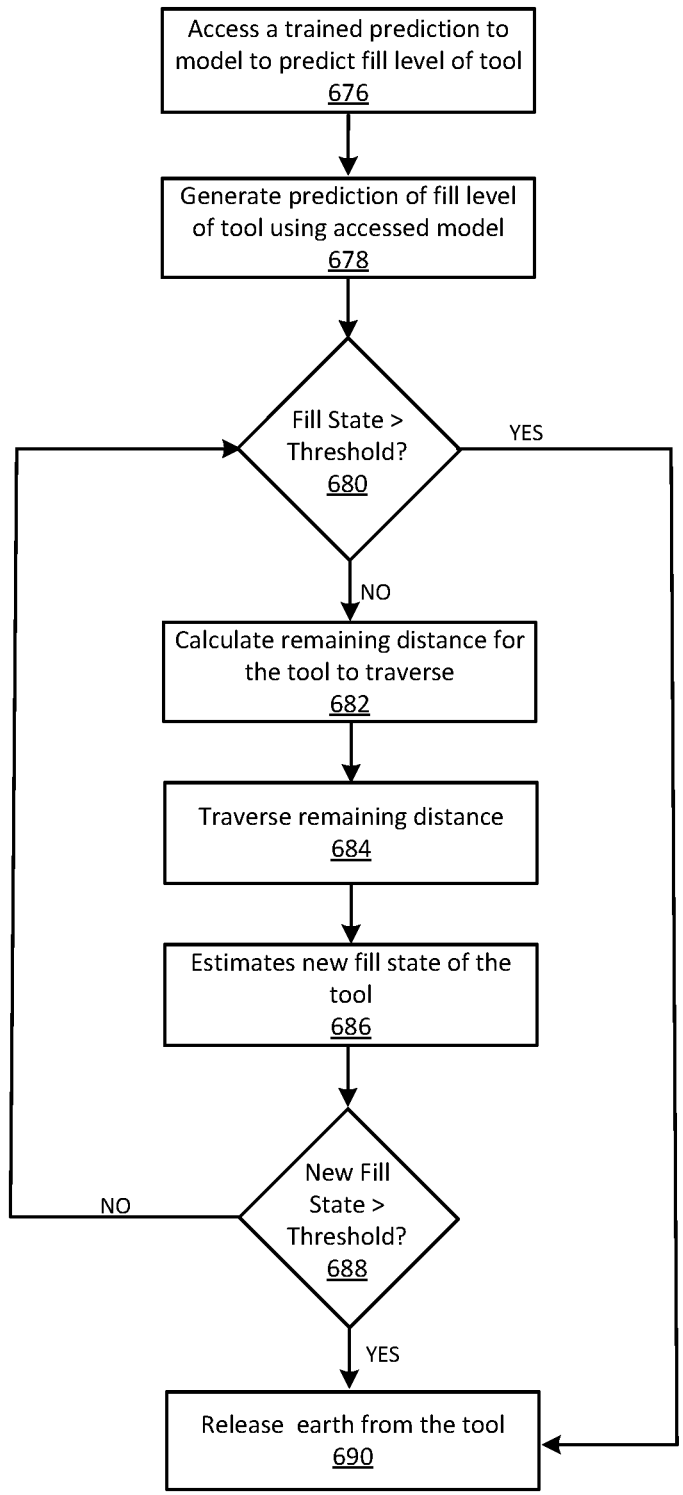
FIG. 6C shows a flowchart describing a process for performing a fill estimate routine, according to an embodiment.

Before interrupting the performance of a target tool path to perform a check routine to raise the earth moving tool 175 above the ground surface and to determine the volume of earth in the bucket, an earth moving vehicle 115 may perform an earth moving routine that includes instructions for a fill estimate routine. As described herein, a fill estimate routine causes the controller 120 to estimate the earth moving tool 175 fill level of without interrupting the movement of the earth moving tool 175 within the target tool path. FIG. 6C shows a flowchart describing the process for the fill estimate engine 620 to perform a fill estimate routine, according to an embodiment.

The fill estimate engine 620 estimates a fill level of an excavation tool coupled to an earth moving vehicle 115 using any one or more of a number of techniques. The fill level of the tool describes the volume of earth in the earth moving tool 175. In one implementation, the fill estimate engine 620 of the earth moving vehicle 115 estimates the volume by mathematically integrating the depth of the leading edge beneath the ground surface over the distance traveled by the earth moving tool 175 over the target tool path. In another implementation, the fill estimate engine 620 uses the point cloud representation of the current state of the dig site gathered using one or more spatial sensors to determine a pre-excavation volume of earth in the hole and accesses, from the central computer 120 or a remote server, a swell factor of the earth relating the volume of earth in the earth moving tool 175 to the pre-excavation volume of earth in the hole. Using the pre-excavation volume of earth in the hole and the swell factor characteristic of the earth, the fill estimate engine 620 may estimate the volume of earth in the earth moving tool 175. Additionally, the fill estimate engine 620 may use the sensor assembly 105 to measure the quantity of earth accumulated in front of the leading edge of the earth moving tool 175 while the earth moving tool 175 is in the position set by the currently-in-progress target tool path. The fill estimate engine 620 may also use measurement sensors to measure the force of earth acting on the tool beneath the surface and adjust the angle of the earth moving tool 175 to estimate the fill level of the earth moving tool 175.

Alternatively, the fill estimate engine 620 may access 676 a previously trained prediction model that is capable of receiving as input the distance traveled by the earth moving tool 175 along with other parameters of the vehicle 115 and earth moving routine and outputting an estimated amount of earth in the earth moving tool 175. These other parameters include, but are not limited to, any sensor value, the tool type and width, the vehicle type, and the depth of the leading edge of the earth moving tool 175 below the ground surface during the target tool path. The fill estimate 620 applies the trained prediction model to generate 678 a trend line that extrapolates tool fill level as a function of distance traveled, which may in turn be used to generate an estimate when to initiate a check or dump routine. Alternately, the prediction model may generate such an estimate directly.

The fill estimate engine 620 compares 680 the fill estimate to a threshold volume. The threshold volume may be the maximum available volume of the earth moving tool 175, a volume set manually by a human operator, a volume set by a calibration procedure using the earth moving tool 175 in an empty state, or another volume.

When the estimated volume is greater than the threshold volume, the digging engine 610 may receive instructions from the fill estimate engine 620 to measure the angle of the earth moving tool 175 beneath the ground surface, adjusts the angle of the earth moving tool 175 towards the breakout angle, and raises the earth moving tool 175 above the ground surface. Alternatively, when the estimated volume is less than the threshold volume, the fill estimate engine 620 may instruct the digging engine 610 to resume performance of the digging routine. However, in one implementation the fill estimate engine 620 calculates 682 the remaining distance for the earth moving tool 175 to traverse in order to be filled at maximum capacity using a trend line generated by the prediction model. Based on the available volume in the excavation tool, the trend line is inputted into the prediction model to determine the remainder distance on the target tool path that the earth moving tool 175 needs to travel to be filled at maximum capacity.

As previously described, in some implementations, the fill estimate engine 620 measures the quantity of earth accumulated in front of the leading edge. When the measured quantity of earth is above a threshold quantity, the earth moving vehicle 115 raises the earth moving tool 175 above the ground surface. Similarly, the fill estimate engine 620 may measure the force of earth acting on the earth moving tool 175 beneath the ground surface and, when the measured force of earth is above a threshold quantity, the digging engine 610 receives instructions to raise the earth moving tool 175 above the ground surface.

After calculating the remaining distance to be traveled, the fill estimate engine 620 traverses 684 the remaining distance and estimates 686 a new volume of earth in the earth moving tool 175. As with the previous volume estimate, the updated volume estimate is compared 688 to the threshold volume. This process may be repeated multiple times. When the estimated volume is greater than the threshold volume, the controller 150 performs a dump routine and releases 690 earth from the earth moving tool 175.

Alternatively, the controller fill estimate engine 620 estimates the volume in the earth moving tool 175 to be below a threshold value and repeats the target tool path without calculating a remaining distance. After navigation the earth moving tool 175 over the remaining distance of the target tool path, the fill level estimate engine 620 periodically measures an updated tool fill level and repeats navigation over the target tool path until the updated volume estimate is greater than the threshold volume.

IV.D Hydraulic Distribution Adjustment

Because maintaining the earth moving tool 175 at a desired angle or depth through the carrying out of a target tool path is a non-trivial task, the hydraulic distribution engine 630 adjusts the hydraulic capacity allocated to the drive system and tool path dynamically to navigate an earth moving vehicle 115 over a target tool path, adjust an earth moving tool 175 to perform an earth moving routine, or a combination thereof. Generally, the earth moving vehicle 115 only has sufficient hydraulic pressure to power a single system at full capacity. As a result, both the drive and tool systems may be powered equivalently at half capacity. However, if, based on soil friction, forces, speeds, tool angles, or other conditions, the angle and depth of the earth moving tool 175 cannot be maintained at half capacity, the hydraulic distribution engine 630 may redistribute the hydraulic pressure within the system to favor the earth moving tool 175 over the drive system (e.g., 75%-25% distribution, or otherwise). The calibration for the hydraulic system may be performed by observing joystick manipulations within the earth moving vehicle 115 and recording the changes in pressure distribution. The remainder of this section describes a number of example operating conditions that can trigger hydraulic pressure adjustments and what those adjustments are.

In moving the earth moving tool 175 through the target tool path, the hydraulic distribution engine 630 measures the speed of the earth moving tool 175 and compares it to a target speed. The target speed refers to the speed that the drive system is traveling. The hydraulic distribution engine 630 may calculate the target speed based on the knowledge of the earth of the dig site exhibiting an industry standard soil friction or a soil friction determined specifically for a particular earth moving vehicle 115, a specific target tool path being performed within a dig site, or more generally the enter dig site. If the hydraulic distribution engine 630 measures that the speed of the earth moving vehicle 115 is lower than the target speed, the hydraulic distribution engine 630 may determine that the soil friction (or force of soil exerted on the tool) is greater than expected and, in response, adjust the distribution of hydraulic pressure between the drive system and the earth moving tool 175 to favor the earth moving tool 175 increase the speed of the earth moving tool 175. While this may be accomplished in some instances by increasing the amount of hydraulic pressure capacity allocated to the drive system, the amount of hydraulic capacity available is finite and so this is not always a viable solution. Often, greater than expected soil friction is due to the earth moving tool 175 being too deep (or angled along a path proceeding downward), thus generating more friction and often causing the earth moving tool 175 to fall off the target tool path. To compensate, the hydraulic distribution engine may adjust the earth moving tool 175 to a shallower depth or angle, which will accomplish reducing the soil friction and raising tool speed. This process may play out in reverse for a tool speed greater than expected, which may be adjusted by lowering the earth moving tool 175 or setting it at a deeper angle.

The maintenance of the hydraulic capacity in this manner and as described elsewhere herein prevents the earth moving vehicle 115 from stalling during the performance of an earth moving routine or from complications regarding raising a t earth moving tool 175 above the ground surface. In one embodiment, to maintain sufficient hydraulic capacity for the earth moving vehicle 115 to make adjustments to the position and orientation of the earth moving tool 175 during the digging routine, the hydraulic distribution engine 630 maintains hydraulic pressure within the hydraulic system below a threshold 90% of the maximum hydraulic pressure capacity.

A breakout event and corresponding breakout angle may be detected as an earth moving tool 175 naturally breaks through the ground surface during the earth moving routine. At speeds above the target speed and/or at forces above the threshold force, the earth moving tool 175 is unable to collect earth and break out of the ground surface. Similarly, at speeds below the target speed and forces below the threshold force, the earth moving tool 175 inefficiently collects earth. To reduce the number of erroneous breakout events that occur during an earth moving routine, the engine 630 measures the force of earth on the earth moving tool 175 and adjusts the distribution of pressure, so that the tool angle has sufficient hydraulic pressure to be adjusted beneath the ground surface. For example, the earth moving tool 175 may be lowered or angled downward to dig more deeply in cases of high speed/low force, and angled upward/raised to dig more shallowly in cases of low speed/high force. Additionally, as the earth moving tool 175 moves through the target tool path and collects earth, the earth moving vehicle may continuously adjust the angle of the earth moving tool 175. If the earth moving tool 175 eventually breaks out of the ground surface, the earth moving vehicle 115 records the breakout angle and may voluntarily opt to perform a volume check routine rather than continuing an earth moving routine.

Before a breakout event occurs, the digging engine 610 may also calculate an expected breakout angle based on the soil composition properties for the earth within the hole. Soil composition properties are further described below. During a digging routine, the digging engine 610 may define the breakout angle as the minimum angle of the earth moving tool 175 at rest. Alternatively, the breakout angle may be established as inversely proportional to the soil cohesion measurement. To achieve the breakout angle as the earth moving tool 175 is raised above the ground surface, the hydraulic distribution engine adjusts the distribution of hydraulic pressure between the drive system and the earth moving tool 175 by monitoring engine load or line pressure sensors in the hydraulic system and dynamically adjusting power output commands to the drivetrain and to the tool actuators.

In another implementation, if the difference in the set of coordinates for the actual tool path and the target tool path is greater than a threshold difference, the distribution of hydraulic pressure is adjusted to lower or raise the earth moving tool 175 at a greater or lesser depth below the ground surface to more closely match the target tool path.

Additionally, the hydraulic distribution engine 630 may use the target tool path received by the digging engine 610 to maintain the hydraulic capacity of the hydraulic system and, when appropriate, adjust the target speed of the drive system by adjusting the distribution of hydraulic pressures. Decreasing the target speed results in a reduction of the overall hydraulic pressure in the hydraulic system to ensure that the hydraulic system offers sufficient scope in to adjust the position and orientation of the tool during the digging routine within minimal delay. For example, if the hydraulic pressure within the system is 98% of the maximum hydraulic pressure, exceeding the threshold hydraulic pressure, the hydraulic distribution engine can reduce the target speed of the earth moving vehicle 115 by dynamically executing instructions to divert hydraulic pressure from the drivetrain to the set of tool actuators. By redistributing hydraulic pressure away from the certain components of engine system and towards other components of the engine system, the hydraulic distribution engine can prioritize certain excavation functions and maintain high excavation efficiency by the earth moving tool 175 and earth moving vehicle 115.

V. Volume Check Routine

Figure 7A:
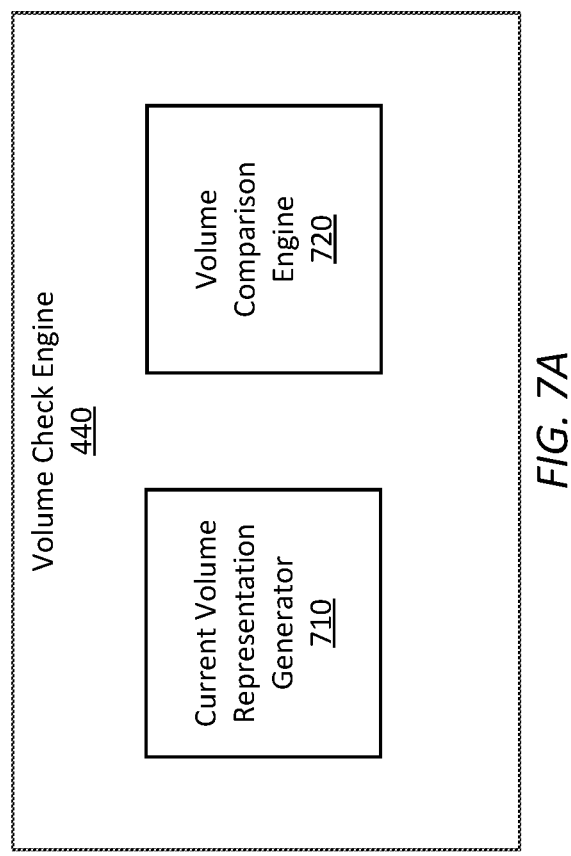
FIG. 7A is a high-level block diagram of a volume check engine, according to one embodiment.

As described above with reference to FIG. 6C, the fill estimate engine 620, may interrupt the performance of an earth moving routine to estimate a fill level of a earth moving tool 175 coupled to an earth moving vehicle 115. If the fill level is estimated to below a threshold, the earth moving vehicle continues to execute instructions for resuming a target tool path to complete the earth moving routine. However, if the fill level of earth moving tool 175 is estimated to be above a threshold, the fill estimate engine 620 communicates instructions for the volume check engine 440 to measure the volume of earth in the tool with higher accuracy. FIG. 7A is a diagram of the system architecture for the volume check engine 440 of an earth moving vehicle 115, according to an embodiment. The volume check engine 440 performs operations to measure the volume of earth in the earth moving tool 175 once raised above the ground surface and determining whether to continue moving the earth moving tool 175 along the target tool path or to perform a dump routine of the earth within the earth moving tool 175. The system architecture of the volume check engine 440 comprises a current volume representation generator 710 and a volume comparison engine 720. In other embodiments, the volume check engine 440 may include more or fewer components. Functionality indicated as being performed by a particular engine may be performed by other engines instead. Some of the engines of the volume check engine 540 may be stored in the control logic 400.

To generate a current representation of the fill state of the earth moving tool 175, the current volume representation generator 710 uses data recorded by the sensors of the sensor array 110. The implemented sensors may include an imaging sensor, a spatial sensor, or some combination of the two sensors and the data describing the fill state of earth moving tool 175 may be represented as a point cloud or an image. The volume check engine 440 adjusts the earth moving tool 175 to a measuring position at a height in the field of view of the one or more sensors. For example, the volume check engine 440 can raise and tilt the earth moving tool 175 to bring the interior volume of the tool into the field of view of the set of sensors. The volume check engine 440 may confirm that the earth moving tool 175 is in the measuring position by sampling data from the position sensors 145 mounted directly on the tool 175 or within the hydraulic system. The volume check engine 440 may also confirm that the earth moving tool 175 is in the measuring position by analyzing images recorded by a system of depth and imaging cameras mounted to the earth moving vehicle 115. If the distribution of earth within the earth moving tool 175 is uneven, the check routine instructions may cause the volume check engine 440 to shake the tool one or more times to achieve a more uniform distribution of the earth inside.

Alternatively, to determine the position of a earth moving tool 175 within the three-dimensional coordinate space, the current volume representation generator 710 may use the sensors 170 by measuring the quantity of earth in the tool and referencing a parametric model or lookup table to determine the position of the tool in the coordinate space. Lookup tables are generated by measuring the output of a sensors at various positions of the earth moving tool 175 and correlating the two conditions. For example, at a depth of 1 meter, the earth moving tool 175 is located at a position 4 meters perpendicular to the ground. The correlation between a depth measurement of 1 meter and a position measurement of 4 meters is stored within the lookup table. The referenced lookup table may differ depending on the type of sensor used and the format of the output provided. The current volume representation generator 710 may receive outputs from multiple sensors facing distinct regions of the interior of the earth moving tool 175.

Next, the current volume representation generator 710 generates a representation of the amount of earth currently in the earth moving tool 175 based on the position of the earth moving tool 175 within the coordinate space and one or more soil composition properties measured by the combination of sensors, for example the densities, sizes, shapes, and colors of the particles of the earth in the earth moving tool 175. A soil property engine analyzes data captured by the sensors 170 to determine the soil composition of the excavated earth within the earth moving tool 175.

In addition to the representation of the amount of earth in the earth moving tool 175, the current volume representation generator 710 also accesses an empty representation of the earth moving tool 175 calibrated prior to the performance of the digging routine. To calibrate the empty representation of the earth moving tool 175, the empty earth moving tool 175 is adjusted to multiple heights and angles above the ground surface. For each of the heights and angles, the current volume representation generator 710 implements a sensor to record data describing the available volume within the empty tool. As described above, the recorded data and the respective height and angle measurements are stored in a lookup table to be referenced by the earth moving vehicle 115. Depending on the sensor used to record the data, the contents of the lookup table may differ, for example a lookup table generated using a spatial sensor 130 includes a point cloud representation of the empty tool at various heights whereas a lookup table generated using a measurement sensor 125 includes a volume measurement of the empty earth moving tool 175 at various heights.

The volume comparison engine 720 compares a representation of the current fill state of the earth moving tool 175 (e.g., in image or point cloud form) and an empty representation of the earth moving tool 175 (in a comparable form) to determine the volume of earth within the earth moving tool 175. The empty representation of the earth moving tool 175 may be generated during an off-run calibration procedure and stored in a memory of the central computer 120 for access and use as part of the check routine. Alternatively, the empty representation may be provided to the volume comparison engine 820 manually by a human operator.

Figure 7B:
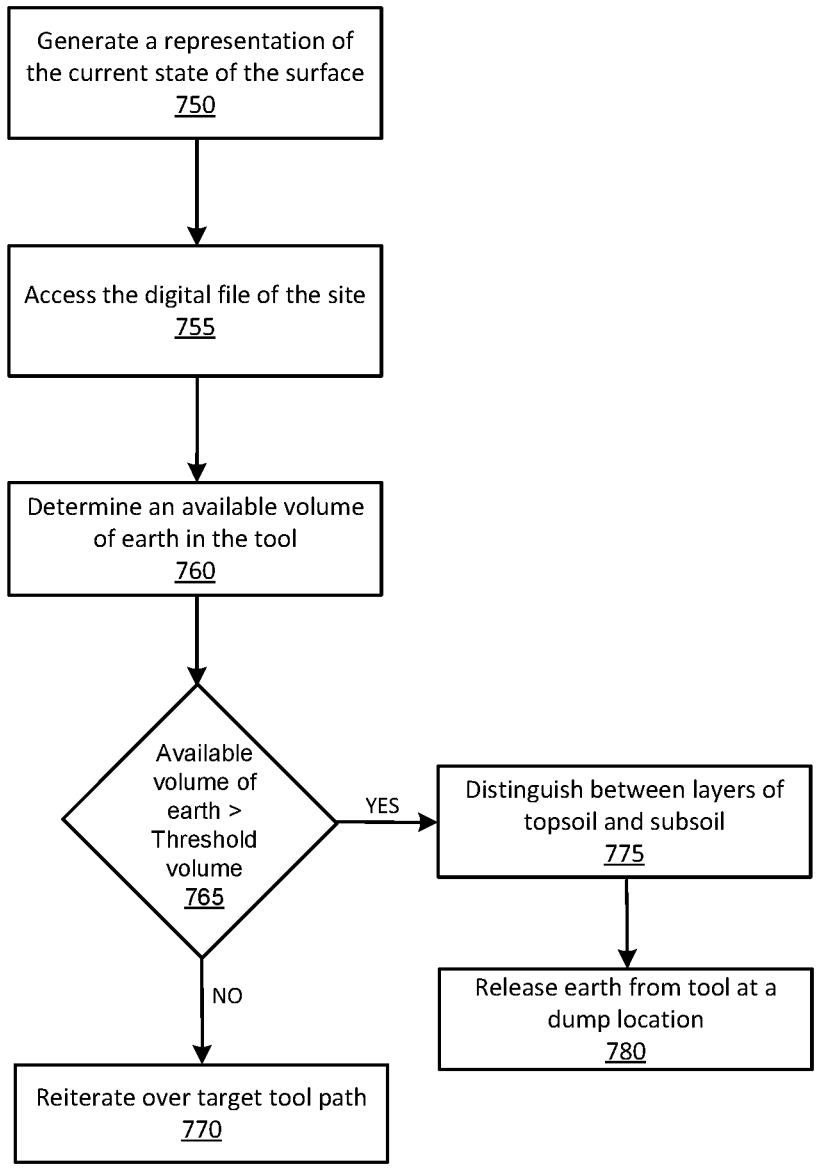
FIG. 7B shows a flowchart describing an alternate implementation for performing a volume check routine, according to one embodiment.

FIG. 7B shows a flowchart describing an alternate implementation for a volume check engine 440 to perform a volume check routine. The current volume representation generator 710 generates 750 the representation of the amount of earth in the earth moving tool 175 using a sensor, for example a spatial sensor 130, to output a three-dimensional representation of the current state of the ground surface. As with the previous implementation, the volume comparison engine 720 accesses 755 the digital file describing the expected state of the dig site. Using the digital file and the representation of the current state to describe the amount of earth excavated from the hole, the volume comparison engine 720 determines 760 a volume difference between the two representations describing the volume of earth within the earth moving tool 175. When comparing 765 the determined volume difference to a threshold difference, if the volume difference is less than a threshold difference, the volume check engine 440 readjusts and maintains the leading edge of the tool beneath the ground surface to adjust the angle of the earth moving tool 175 and reiterates 770 over the target tool path. Alternatively, if the volume difference is greater than a threshold difference, the volume check engine 440 releases 775 earth from the earth moving tool 175 at a corresponding fill location.

The volume check engine 440 may update the predictive excavation model based on data collected before, during, or after the completion of a target tool path to guide the movement of the earth moving vehicle 115 within the dig site during any additional target tool paths. For example, the volume check engine 440 updates the trained predictive model discussed above with data with collected during the completed target tool path and implement the updated predictive model to determine the horizontal distance that the earth moving tool 175 must travel, at a known depth below the ground surface, to excavate the remaining amount of earth. The volume check engine 440 may update the predictive model to define a relationship between the depths of the earth moving tool 175 below the ground surface of the leading edge, the horizontal distance traversed by the earth moving tool 175, the amount of earth loaded into the earth moving tool 175, the soil composition within the dig site, and the earth moving tool 175 width.

More information regarding the preparation of an earth moving routine and the generation of target tool paths outlining operations for performing the earth moving routine can be found in U.S. patent application Ser. No. 15/877,223 filed on Jan. 22, 2018, which is incorporated by reference herein in its entirety.

VI. Earth Moving Vehicle State Detection

Figure 8A:
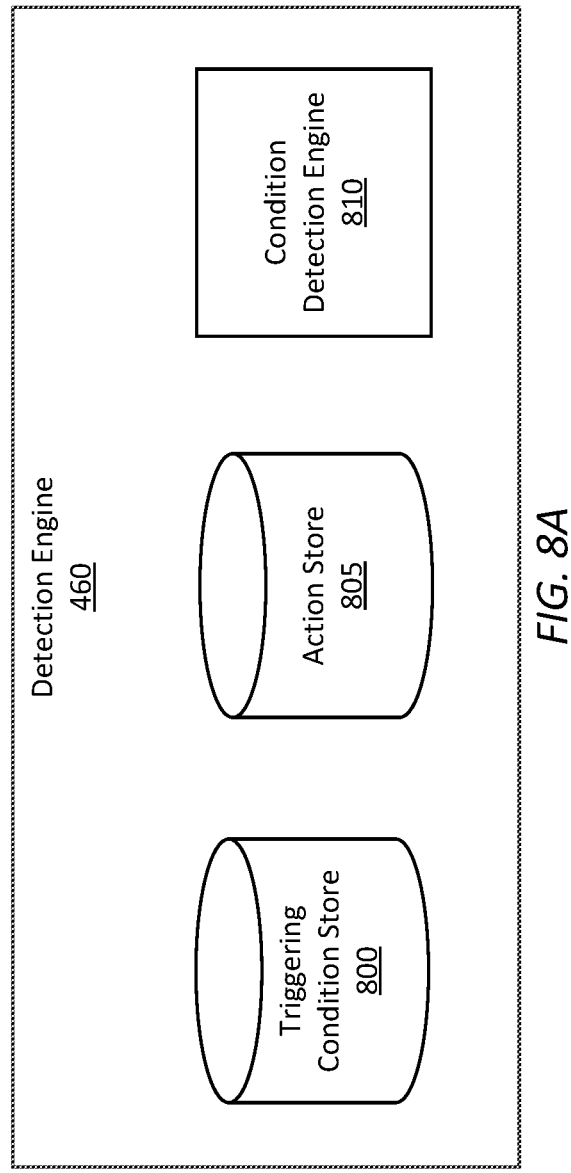
FIG. 8A is a high-level block diagram of a detection engine, according to one embodiment.

FIG. 8A is a high-level block diagram of a detection engine 460, according to one embodiment. The detection engine 460 includes a triggering condition store 800, an action store 805, and a condition detection engine 810. In some embodiments, the detection engine 460 may include additional or alternative modules, datastores, or engines the complete the following steps.

The condition detection engine 810 monitors a state of the earth moving vehicle 115 in real-time as the earth moving vehicle 115 autonomously performs earth moving routines and operations. Though the condition detection engine is described in relation to an autonomous performance of the earth moving vehicle 115, in some embodiments, the performance may not be autonomous and the earth moving machine 115 may be controlled by a remote or local operator. The state of the earth moving vehicle 115 may indicate its position in space (e.g., at the dig site), the abilities of sensors 170 in the sensor assembly 110, movement and position of the earth moving tool 175, and the like. The condition detection engine 810 may determine the state of the earth moving vehicle 115 based on sensor data captured by sensors 170 in the sensor assembly 110, such as GPS data, image data, accelerometer data, inertial measurement unit (IMU) data, etc.

The condition detection engine 810 also monitors a state of the dig site around the earth moving vehicle 115 in real-time as the earth moving vehicle 115 autonomously performs earth moving routines and operations at the dig site. In some embodiments, the condition detection engine 810 retrieves contextual information describing current physical state of the dig site from the sensor data store 520 or a representation of the current physical state of the dig site from the preparation engine 420, which generates the representation, as described previously. In other embodiments, the condition detection engine 810 may determine the state of the dig site based on sensor data captured by the sensors 170 in the sensor assembly 170.

Based on the state of the earth moving vehicle 115 and/or dig site, the condition detection engine 810 determines whether the state triggers one or more triggering conditions. Triggering conditions are circumstances that occur in relation to a state of the earth moving vehicle 115, dig site, or both that, upon occurrence, indicate to the condition detection engine 810 that the earth moving vehicle 115 may need to pause any autonomous behavior (e.g., to reduce risk in the environment of the dig site). For example, a triggering condition may be that the earth moving vehicle 115 moves within 2 feet from a vertical drop of more than 2 feet or that the earth moving tool 175 is stuck against a rock. Other examples of triggering conditions include detecting weight balance of the earth moving vehicle 115 above a threshold ratio, a subterranean obstacle at the site, a terrain feature above a threshold size, unexpected movement of the earth moving vehicle 115, an error condition at the on-unit computer 120*a*, an inability of the earth moving vehicle 115 to find a tractable travel path for performing an earth moving operation, incline data above a threshold incline, a collision above a threshold magnitude, detection of one or more humans within a threshold proximity of the EMV, or determining that the EMV is within a threshold proximity of a geofence. Triggering conditions are stored in the triggering condition store 800, which the condition detection engine 810 may access while monitoring the state of the earth moving vehicle 115 and state of the dig site.

Furthermore, the condition detection engine 810 may update triggering conditions stored in the triggering condition store 800 over time. For instance, in some embodiments, triggering conditions may change based on the environment of a dig site (e.g., a dig site in Texas may be associated with a triggering condition for the tool earth moving tool 175 hitting granite in the ground, whereas a dig site in California may not be due to the lack of granite within the area of the dig site). Upon determining information about the environment from sensor data (i.e., that the environment is in California and not Texas), the condition detection engine 810 may update one or more triggering conditions in the triggering condition store 800. In other embodiments, the triggering conditions may be the same for any environment, and the condition detection engine 810 only updates the triggering conditions upon receiving input from a remote or local operator indicating a new or changed triggering condition. For example, the operator may indicate to add a triggering condition when moisture is detected (i.e., from rain) in an environment where the ground becomes slick when wet.

Each triggering condition may be associated with an amount of risk. Risk indicates an uncertainty that may pose an issue towards maintaining a safe environment at the dig site. For example, the triggering condition that the earth moving vehicle 115 is within 2 feet from a 2 or more-foot drop may be associated with the risk of the earth moving machine falling and breaking one or more components. The risk associated with each triggering condition may be quantified and stored with the triggering conditions in the triggering condition store 800. The quantified risks may be determined by an external operator or system or by a machine learning model or simulation system that determines risk based on an example set of scenarios (e.g., combinations of triggering conditions and potential outcomes based on a triggering condition occurring). For example, a machine learning model may be trained to determine risk for a triggering condition using triggering conditions labeled with one or more outcomes that are probable to occur when the triggering condition occurs. Alternatively, a simulation system may run a variety of simulations representing outcomes that could happen when a triggering condition occurs.

When the condition detection engine 810 determines that a triggering condition has occurred based on the state of the earth moving vehicle and/or dig site, the condition detection engine 810 retrieves a risk associated with the triggering condition from the triggering condition store 800. Alternatively, the condition detection engine may determine a current amount of risk associated with the state of the earth moving vehicle 115 or dig site based on sensor data captured by the sensors 170, input from an operator, and the like. The condition detection engine 810 may determine risk using a machine learning model that takes sensor data as input and is trained on examples states of an earth moving vehicle 115 and/or dig site labeled with risk and sensor data or using a predetermined algorithm that calculates risk based on the sensor data.

If the condition detection engine 810 detects more than one triggering condition at once, the condition detection engine 810 may determine an overall risk associated with the state of the earth moving vehicle 115 and/or dig site based on real-time sensor data. Alternatively, the condition detection engine may retrieve or determine risk for each triggering condition that has been detected and combines the risks for each triggering condition together, such as by summing, multiplying, or otherwise combining the risks into an overall risk.

The condition detection engine 810 compares the risk (or overall risk, in some embodiments) to a plurality of threshold risks. In one embodiment, the condition detection engine 810 compares the risk to a first threshold risk and a second threshold risk that is greater than the first threshold risk. In other embodiments, the condition detection engine 810 may compare the risk to only one threshold risk or more than two threshold risks. Based on the comparison, the condition detection engine 810 determines one or more actions for the earth moving machine 115 to take. Actions may reduce the risk associated with the state of the earth moving vehicle 115 or dig site and may be carried out by the controller 150 or on-unit computer 120a. Examples of actions include stopping the earth moving vehicle 115, sounding an alarm at the earth moving vehicle 115, sending an alert to a remote operator, and moving the earth moving vehicle 115, among others.

The condition detection engine 810 may retrieve actions from the action store 805. The actions may be categorized based on the threshold risks. For example, actions may be grouped into actions to take when overall risk does not exceed the first threshold (henceforth referred to as the "first group"), actions to take when the overall risk exceeds the first threshold but not the second threshold (henceforth referred to as the "second group"), and actions to take when the overall risk exceeds the second threshold (henceforth referred to as the "third group").

In embodiments where the condition detection engine 810 compares the risk to more threshold risks, more groups may exist within the action store 805. For example, actions in the first group may be to continue performing an earth moving routine or operation and notifying a remote operator that a triggering condition was met whereas actions in the second group may be configuring the earth moving vehicle 115 to operate in a default state and notifying a remote operator that the triggering condition was met. The default state may be when the earth moving vehicle 115 is static, located in a starting position (e.g., a designated starting location at the dig site where the earth moving vehicle 115 began operations from), located at a safe position (e.g., a location at the dig site that an operator has indicated or that the earth moving vehicle has determined is safe for the earth moving vehicle 115 or where the earth moving vehicle 115 has previously been located), and/or located a threshold distance away from a potential safety hazard. The earth moving vehicle 115b may also configure itself to operate in the default state by reducing the speed of one or more motors of the engine, raising the earth moving tool 175, moving the earth moving tool 175 to a safe position (e.g., completely lowered), and/or moving to a flat surface at the dig site.

Furthermore, actions in the third group may include pausing performance off the earth moving routine or operation until feedback is received from a remote operator, performing another earth moving routine or operation instead, updating instructions for the earth moving routine or operation to skip an area of the dig site, and/or notifying the remote operator that the triggering condition as met and the earth moving routine or operation was paused. The earth moving operation may remain paused until an operator manually confirms or manually performs the operation via the earth moving system 100. In some embodiments, the condition detection engine 810 may send the notifications to the on-unit computer 120a such that an operator may see the notifications when accessing the on-unit computer 120a, either when notification is sent or at a later time.

Once the condition detection engine 810 has determined one or more actions for the earth moving engine 115 to take based on the risk, the condition detection engine 810 may indicate to the controller 150 may carry out instructions that cause the earth moving vehicle 115 to perform the one or more actions. Additionally or alternatively, the condition detection engine 810 may send actions to the on-unit computer 120a to take, such as sending an alert to a remote operator.

In some embodiments, a determined action comprises sending an alert to a remote operator, and the condition detection engine 810 may request a response from the remote operator via a computer 120. Upon receiving a response from the remote operator, instruct the controller 150 or on-unit computer 120a to take action based on the response. For example, if the remote operator indicates that manual operation is needed to mitigate the risk, the condition detection engine 810 may cause the controller 150 to follow instructions that stop any movement from the earth moving vehicle 115 and reduce power consumption until a local operator can take control of the earth moving vehicle 115. Alternatively, the remote operator may indicate that the earth moving vehicle 115 should skip the earth moving operation and continue the rest of the earth moving routine or another earth moving operation. In another example, if feedback from the remote operator indicates that the state is no longer associated with or poses greater than the first threshold risk (or, in some cases, the second threshold risk), the condition detection engine 115 may cause the earth moving engine 115 to continue to autonomously performing the earth moving routine or operation.

Figure 8B:
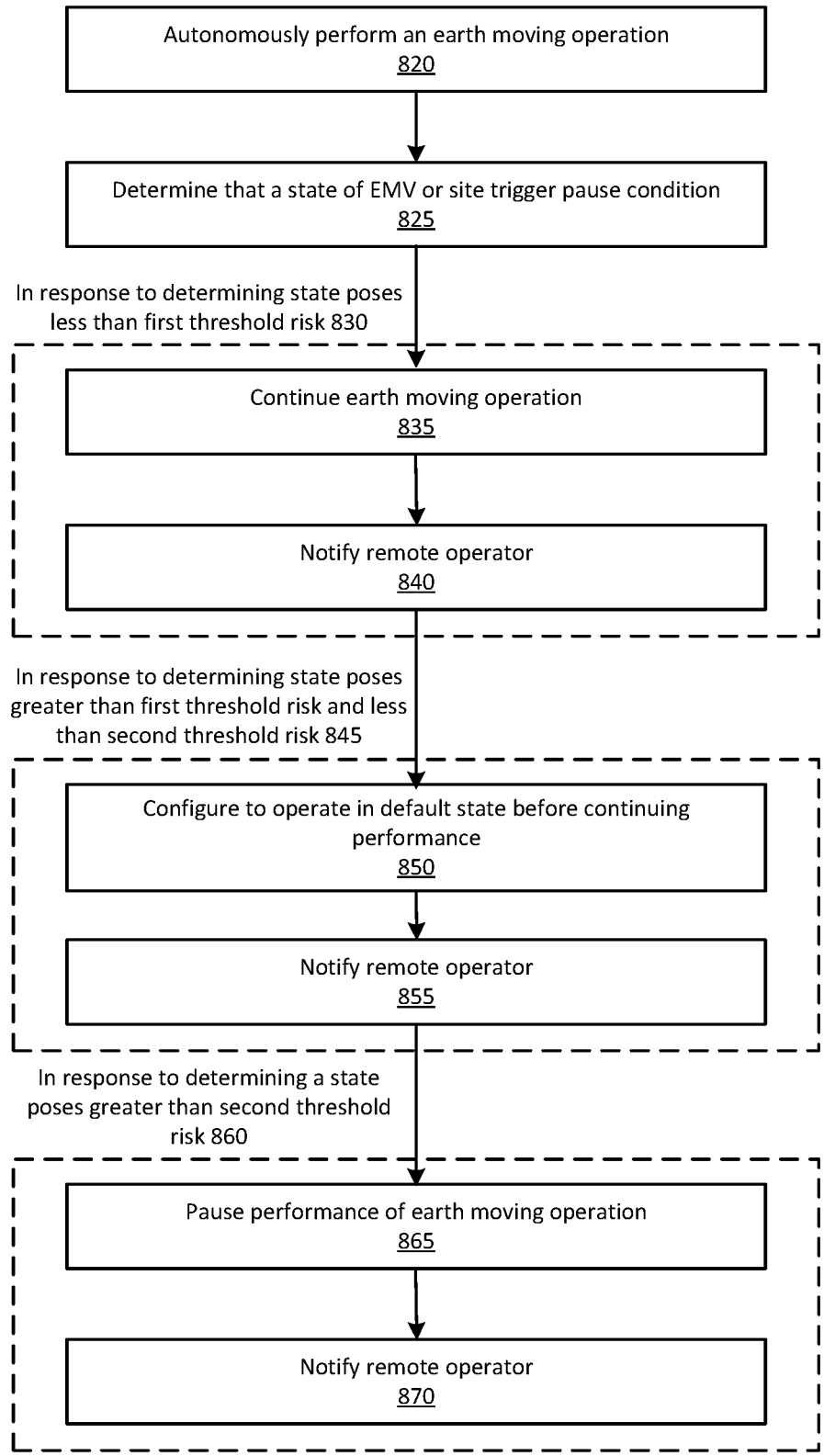
FIG. 8B is a flowchart describing a process for taking actions based on a state of an earth moving vehicle, according to one embodiment.

FIG. 8B is a flowchart describing a process 815 for taking actions based on a state of an earth moving vehicle, according to one embodiment. In particular, the earth moving vehicle 115 autonomously performs 820 an earth moving operation (or routine) within a dig site. While performing the earth moving operation, the condition detection engine 810 of the earth moving vehicle 115 determines 825 that a state of one or more of the earth moving vehicle 115 or the dig site trigger a triggering condition associated with a pause in the autonomous behavior of the earth moving vehicle 115. The condition detection engine 810 determines an amount of risk that the state poses and compares the risk to one or more threshold risks. In response to determining 830 that the risk is less than a first threshold risk (i.e., the state poses less than the first threshold risk), the condition detection engine 810 causes the earth moving vehicle 115 to continue 835 autonomous performance of the earth moving operation and notify 840 a remote operator that the triggering condition was triggered and the earth moving vehicle 115 is continuing to perform the earth moving operation.

Further, in response to determining 845 that the determined state poses risk that is greater than the first threshold risk but less than a second threshold risk, the earth moving vehicle 115 is configured 850 to operate in a default state, such as moving the earth moving tool 175 to an initial position or returning to a starting location at the dig site, before continuing autonomous performance of the earth moving operation. The condition detection engine 810 also notifies 855 the remote operator that the earth moving vehicle 115 is configured to operate in the default state before continuing to perform the earth moving operation. In response to determining 860 that the determined state poses a risk that is greater than the second threshold, the condition detection engine 810 pauses 865 performance of the earth moving operation until the condition detection engine 810 receives feedback from the remote operator indicating one or more actions for the earth moving vehicle 115 to take and notifies 870 the remote operator of the state of the earth moving vehicle 115.

In some embodiments, the condition detection engine 810 may receive feedback from the remote operator indicating one or more actions for the earth moving vehicle 115 to take based on the state. For instance, the condition detection engine may receive feedback indicating for the earth moving vehicle 115 to move to a location within the environment of the dig site. The condition detection engine 810 may cause (i.e., by indicating to the controller to instruct) the earth moving vehicle 115 to navigate to the location and continue performing an earth moving operation. The remote operator may provide such feedback via a graphical user interface (GUI) that presents information describing the performance of the earth moving vehicle at the dig site while it performs earth moving routines and operations. Such information may include location data and movement data describing the real-time performance of the earth moving vehicle 115. The GUI may also present alerts or notifications to the remote operator when one or more triggering conditions are triggered. The GUI is further described in relation to FIGS. 9A-B.

Figure 9A:
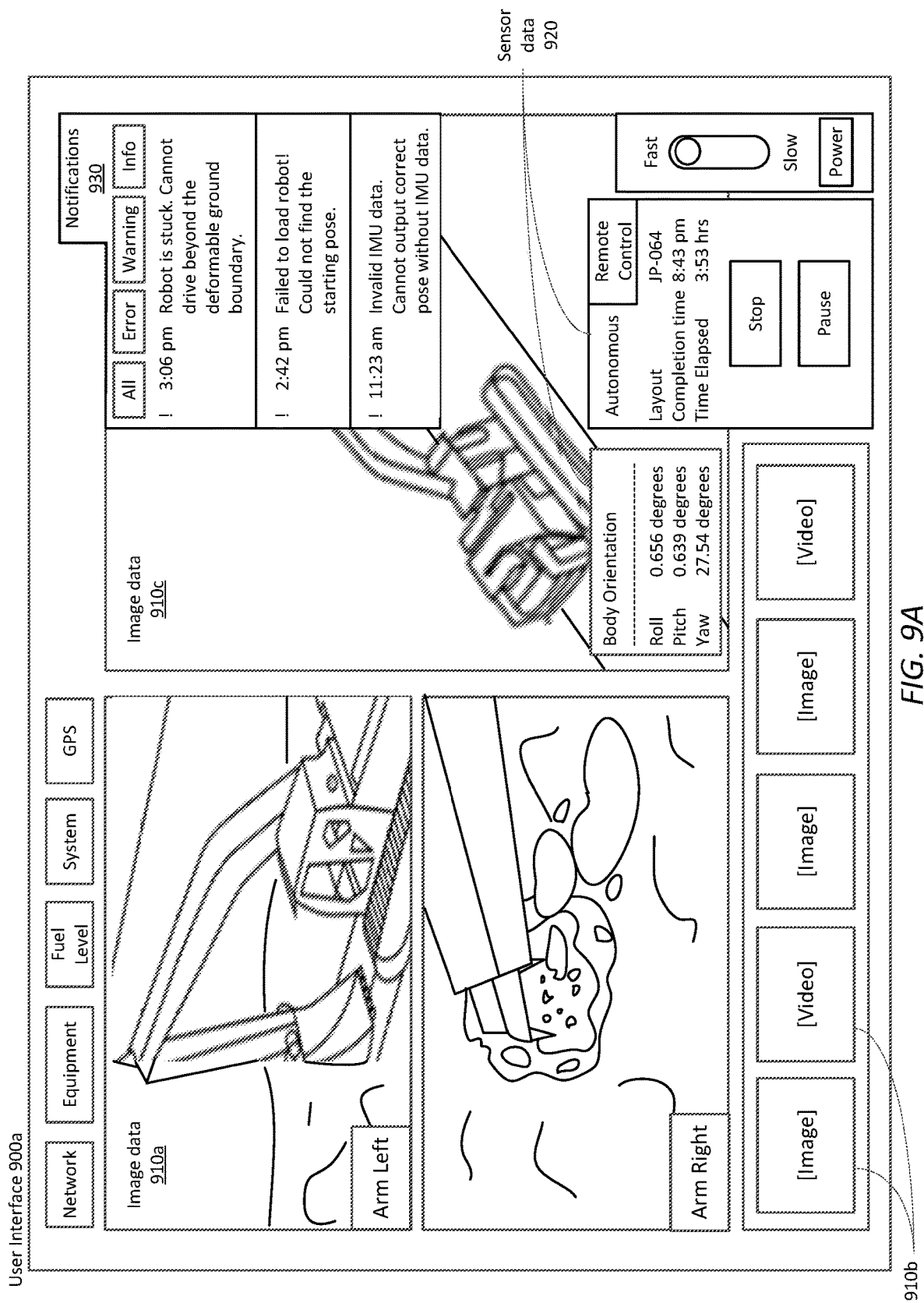
FIG. 9A is an example user interface depicting information about a state of an earth moving vehicle, according to one embodiment.

FIG. 9A is an example user interface 900a depicting information about a state of an earth moving vehicle, according to one embodiment. The user interface 900a may be a GUI presented via a display of a computing device such as a laptop computer, mobile phone, and the like. As shown, the user interface 900a may depict image data 910 captured by cameras on the earth moving vehicle 115 (or, in some embodiments, similarly-located earth moving vehicles 115). The user interface 900a also includes sensor data 920 and statistics captured in real-time at the earth moving vehicle 115. For example, the sensor data 920 and statistics shown includes body orientation of the earth moving vehicle 115, time spent performing an earth moving operation, and estimated time of completion of the earth moving operation.

Figure 9B:
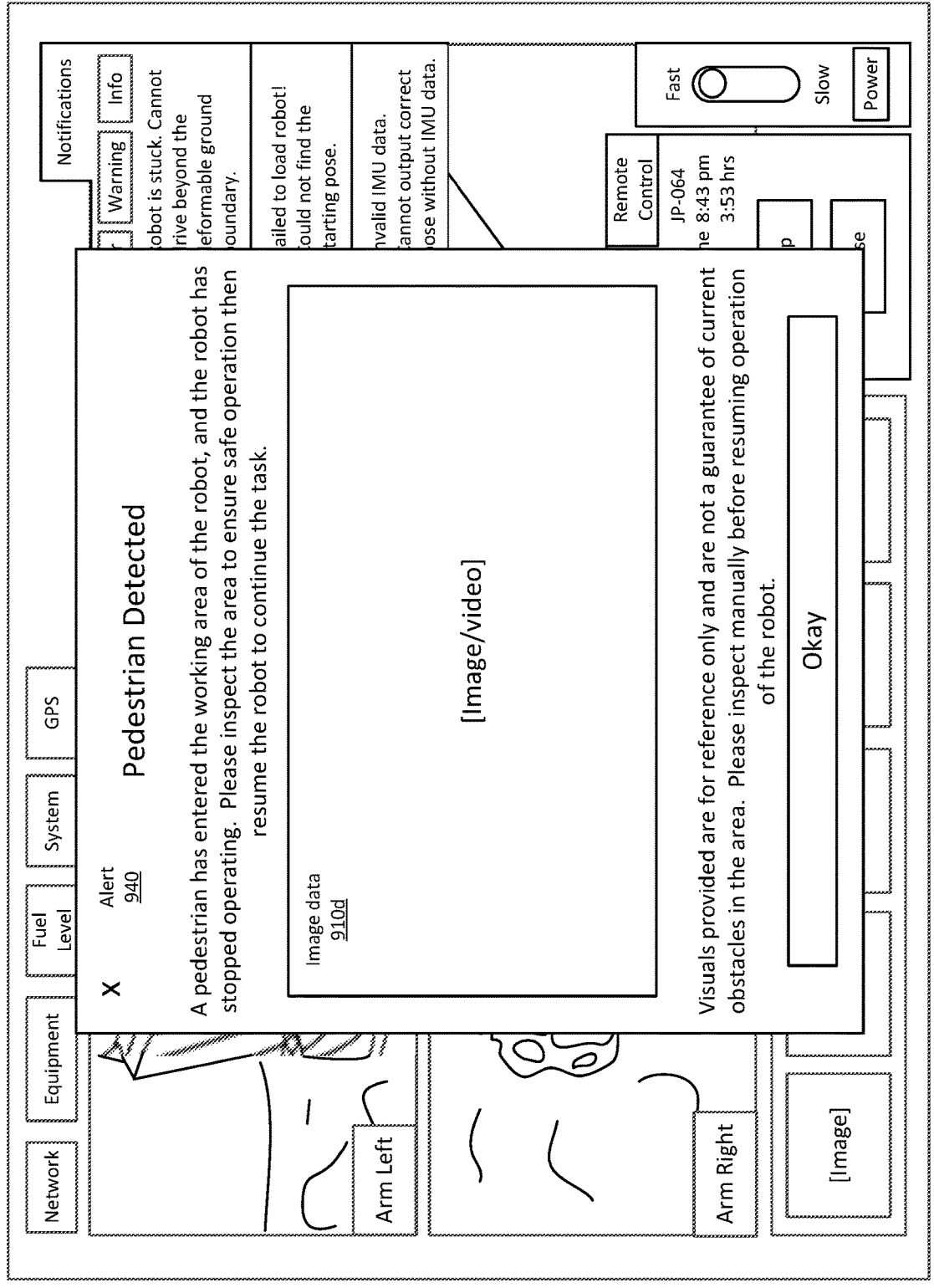
FIG. 9B is an example user interface depicting an alert for an earth moving vehicle, according to one embodiment.

The user interface 900a further depicts notifications 930 and alerts received from the condition detection engine 810 in response to one or more triggering conditions being triggered by the state of the earth moving vehicle 115 or dig site. The notifications 930 and alerts each describe the triggering condition or state, such as the earth moving vehicle 115 being stuck or sensor data being invalid. In some cases, alerts 940 may show up in boxes within the user interface 900b, as shown in FIG. 9B. Alerts may include textual information describing a triggering condition or state and image data 910 and/or sensor data related to the triggering condition or state. The alert 940 may also include an interactive element for an operator to indicate an action for the earth moving vehicle 115 to take or to acknowledge the alert. Other interactive elements may be included throughout the user interface 900b that allow an operator to select actions for the earth moving engine 115, view specific sensor data, and the like.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
autonomously performing, by an autonomous vehicle (AV), an operation within a site, wherein the operation includes adjusting a tool of the AV to manipulate material within the site;
while performing the operation, determining, autonomously by the AV, a risk associated with a state of the AV which triggers one or more triggering conditions, wherein the risk is computed based on the one or more triggering conditions and a potential outcome of each of the one or more triggering conditions, the one or more triggering conditions comprising: detection of a collision above a threshold magnitude, detection that the AV is within a threshold proximity of a geofence, and detection of one or more humans within a threshold proximity of the AV;
in response to determining that the computed risk is greater than a first threshold risk but less than a second threshold risk, notifying, autonomously by the AV, a remote operator that the one or more triggering conditions were triggered and reducing, autonomously by the AV, a motor speed of the AV before continuing the autonomous performance of the operation; and
in response to determining that the computed risk is greater than the second threshold risk, notifying, autonomously by the AV, the remote operator of the state of the AV and pausing, autonomously by the AV, the autonomous performance of the operation until feedback is received from the remote operator.

2. The method of claim 1, further comprising:
in response to receiving, from the remote operator, feedback indicating that the computed risk is no longer greater than the first threshold risk, continuing, autonomously by the AV, the autonomous performance of the operation.

3. The method of claim 1, further comprising:
in response to receiving, from the remote operator, feedback indicating that the computed risk is no longer greater than the second threshold risk, continuing, autonomously by the AV, the autonomous performance of the operation.

4. The method of claim 1, further comprising:
in response to receiving, from the remote operator, feedback indicating a location within the site, navigating, autonomously by the AV, to the location to continue performing the operation.

5. The method of claim 1, wherein the remote operator provides the feedback to the AV through a graphical user interface (GUI) that presents information describing performance of the AV while performing operations.

6. The method of claim 5, wherein the GUI presents alerts to the remote operator in response to the one or more triggering conditions being triggered, the alerts indicating a potential risk for the AV.

7. The method of claim 5, wherein the GUI presents location data and movement data describing real-time performance of the AV.

8. A non-transitory computer-readable storage medium comprising instructions executable by a processor of an autonomous vehicle (AV), the instructions, when executed by the processor, cause the processor to perform steps comprising:
autonomously performing an operation within a site, wherein the operation includes adjusting a tool of the AV to manipulate material within the site;
while performing the operation, determining a risk associated with a state of the AV which triggers one or more triggering conditions, wherein the risk is computed based on the one or more triggering conditions and a potential outcome of each of the one or more triggering conditions, the one or more triggering conditions comprising: detection of a collision above a threshold magnitude, detection that the AV is within a threshold proximity of a geofence, and detection of one or more humans within a threshold proximity of the AV;
in response to determining that the computed risk is greater than a first threshold risk but less than a second threshold risk, notifying a remote operator that the one or more triggering conditions were triggered and reducing a motor speed of the AV before continuing the autonomous performance of the operation; and
in response to determining that the computed risk is greater than the second threshold risk, notifying the remote operator of the state of the AV and pausing the autonomous performance of the operation until feedback is received from the remote operator.

9. The non-transitory computer-readable storage medium of claim 8, wherein the instructions, when executed by the processor, cause the processor to perform further steps comprising:
in response to receiving, from the remote operator, feedback indicating that the computed risk is no longer greater than the first threshold risk, continuing the autonomous performance of the operation.

10. The non-transitory computer-readable storage medium of claim 8, wherein the instructions, when executed by the processor, cause the processor to perform further steps comprising:
in response to receiving, from the remote operator, feedback indicating that the computed risk is no longer greater than the second threshold risk, continuing the autonomous performance of the operation.

11. The non-transitory computer-readable storage medium of claim 8, wherein the instructions, when executed by the processor, cause the processor to perform further steps comprising:
in response to receiving, from the remote operator, feedback indicating a location within the site, navigating to the location to continue performing the operation.

12. The non-transitory computer-readable storage medium of claim 8, wherein the remote operator provides the feedback to the AV through a graphical user interface (GUI) that presents information describing performance of the AV while performing operations.

13. The non-transitory computer-readable storage medium of claim 12, wherein the GUI presents alerts to the remote operator in response to the one or more triggering conditions being triggered, the alerts indicating a potential risk for the AV.

14. The non-transitory computer-readable storage medium of claim 12, wherein the GUI presents location data and movement data describing real-time performance of the AV.

15. An autonomous vehicle, comprising:
a hardware processor; and
a non-transitory computer-readable storage medium storing executable instructions that, when executed by the hardware processor, cause the autonomous vehicle (AV) to perform steps comprising:
  autonomously performing an operation within a site, wherein the operation includes adjusting a tool of the AV to manipulate material within the site;
  while performing the operation, determining a risk associated with a state of the AV which triggers one or more triggering conditions, wherein the risk is computed based on the one or more triggering conditions and a potential outcome of each of the one or more triggering conditions, the one or more triggering conditions comprising: detection of a collision above a threshold magnitude, detection that the AV is within a threshold proximity of a geofence, and of detection of one or more humans to within a threshold proximity of the AV;
  in response to determining that the computed risk is greater than a first threshold risk but less than a second threshold risk, notifying a remote operator that the one or more triggering conditions were triggered and reducing a motor speed of the AV before continuing the autonomous performance of the operation; and
  in response to determining that the computed risk is greater than the second threshold risk, notifying the remote operator of the state of the AV and pausing the autonomous performance of the operation until feedback is received from the remote operator.

16. The autonomous vehicle of claim 15, wherein the instructions, when executed by the hardware processor, cause the AV to perform further steps comprising:
  in response to receiving, from the remote operator, feedback indicating that the computed risk is no longer greater than the first threshold risk, continuing the autonomous performance of the operation.

17. The autonomous vehicle of claim 15, wherein the instructions, when executed by the hardware processor, cause the AV to perform further steps comprising:
  in response to receiving, from the remote operator, feedback indicating that the computed risk is no longer greater than the second threshold risk, continuing the autonomous performance of the operation.

18. The autonomous vehicle of claim 15, wherein the instructions, when executed by the hardware processor, cause the AV to perform further steps comprising:
  in response to receiving, from the remote operator, feedback indicating a location within the site, navigating to the location to continue performing the operation.

19. The autonomous vehicle of claim 15, wherein the remote operator provides the feedback to the AV through a graphical user interface (GUI) that presents information describing performance of the AV while performing operations.

20. The autonomous vehicle of claim 19, wherein the GUI presents alerts to the remote operator in response to the one or more triggering conditions being triggered, the alerts indicating a potential risk for the AV.

* * * * *